United States Patent
Kimura

(10) Patent No.: US 10,533,474 B2
(45) Date of Patent: Jan. 14, 2020

(54) ENGINE DEVICE

(71) Applicant: Yanmar Co. Ltd., Osaka-shi, Osaka (JP)

(72) Inventor: Tomoyuki Kimura, Osaka (JP)

(73) Assignee: YANMAR CO., LTD., Osaka (JP)

( * ) Notice: Subject to any disclaimer, the term of this patent is extended or adjusted under 35 U.S.C. 154(b) by 29 days.

(21) Appl. No.: 15/475,677

(22) Filed: Mar. 31, 2017

(65) Prior Publication Data

US 2017/0204770 A1 Jul. 20, 2017

Related U.S. Application Data

(63) Continuation of application No. PCT/JP2015/077302, filed on Sep. 28, 2015.

(30) Foreign Application Priority Data

Oct. 6, 2014 (JP) .................................. 2014-205770
Oct. 6, 2014 (JP) .................................. 2014-205771

(51) Int. Cl.
*F01N 3/28* (2006.01)
*B60K 13/04* (2006.01)
(Continued)

(52) U.S. Cl.
CPC .......... *F01N 3/2839* (2013.01); *B60K 5/1208* (2013.01); *B60K 13/04* (2013.01); *F01N 3/0211* (2013.01); *F01N 3/2066* (2013.01); *F01N 13/10* (2013.01); *F02M 26/03* (2016.02); *F02M 26/15* (2016.02); *F02M 26/23* (2016.02)

(58) Field of Classification Search
CPC ...... F01N 13/10; F01N 3/0211; F01N 3/2066; F01N 3/2839; F02M 26/15
See application file for complete search history.

(56) References Cited

U.S. PATENT DOCUMENTS 8,820,468 B2 * 9/2014 Sekiya ................... B60K 13/04
                                                180/309
8,887,493 B2 * 11/2014 Shin ....................... F01N 13/00
                                                180/309
(Continued)

FOREIGN PATENT DOCUMENTS

EP        3121048 A1      1/2017
JP     2009061950 A  *   3/2009
(Continued)

OTHER PUBLICATIONS

English Machine Translation of JP2009-061950 to Suzuki, Takayuki (Year: 2009).*

*Primary Examiner* — Audrey K Bradley
*Assistant Examiner* — Anthony Ayala Delgado
(74) *Attorney, Agent, or Firm* — Norton Rose Fulbright US LLP

(57) ABSTRACT

In the engine device having an exhaust gas purification device which removes particulate matters in exhaust gas of the engine or nitrogen oxides in the exhaust gas of the engine, the exhaust gas purification device is firmly fixed to a support base, and an exhaust gas outlet pipe of the engine is provided with an exhaust connection portion which connects an exhaust gas inlet of the exhaust gas purification device, and a support base connection portion which connects the support base.

20 Claims, 24 Drawing Sheets

(51) Int. Cl.
  *F02M 26/03*  (2016.01)
  *F02M 26/15*  (2016.01)
  *F02M 26/23*  (2016.01)
  *B60K 5/12*  (2006.01)
  *F01N 3/021*  (2006.01)
  *F01N 3/20*  (2006.01)
  *F01N 13/10*  (2010.01)

(56) References Cited

U.S. PATENT DOCUMENTS

| | | | |
|---|---|---|---|
| 9,334,786 B2* | 5/2016 | Himoto | E02F 9/0866 |
| 9,388,729 B2* | 7/2016 | Himoto | E02F 9/0866 |
| 2008/0072576 A1 | 3/2008 | Honda et al. | |
| 2010/0050976 A1 | 3/2010 | Taki et al. | |
| 2010/0326059 A1* | 12/2010 | Mital | F01N 3/0222 |
| | | | 60/297 |
| 2012/0247861 A1* | 10/2012 | Mizuno | B60K 13/04 |
| | | | 180/296 |
| 2013/0263593 A1* | 10/2013 | Gonzalez Delgado | |
| | | | F01N 3/103 |
| | | | 60/605.2 |
| 2014/0116797 A1 | 5/2014 | Hayashi et al. | |
| 2014/0299401 A1* | 10/2014 | Nakagami | E02F 9/0866 |
| | | | 180/309 |
| 2015/0167523 A1* | 6/2015 | Tsutsumi | F01N 3/10 |
| | | | 60/299 |
| 2015/0306950 A1 | 10/2015 | Sandou | |
| 2015/0330056 A1 | 11/2015 | Himoto et al. | |
| 2016/0010308 A1* | 1/2016 | Shimohira | E02F 9/0841 |
| | | | 180/309 |
| 2016/0046181 A1 | 2/2016 | Nishimura | |
| 2017/0009628 A1 | 1/2017 | Kimura et al. | |

FOREIGN PATENT DOCUMENTS

| | | |
|---|---|---|
| JP | 4605205 B2 | 10/2010 |
| JP | 4703260 B2 | 3/2011 |
| JP | 2012-072722 A | 4/2012 |
| JP | 5020185 B2 | 6/2012 |
| JP | 2012-215022 A | 11/2012 |
| JP | 2013-1132 A | 1/2013 |
| JP | 5363681 B1 | 12/2013 |
| JP | 2014-040835 A | 3/2014 |
| WO | 2014/061170 A1 | 4/2014 |
| WO | 2014/084316 A1 | 6/2014 |
| WO | 2014/157284 A1 | 10/2014 |

\* cited by examiner

ENGINE DEVICE

CROSS-REFERENCE TO RELATED APPLICATIONS

The present application is a continuation application of International Application No. PCT/JP2015/077302, filed Sep. 28, 2015, which claims priority to Japanese Patent Application No. 2014-205770, filed Oct. 6, 2014 and Japanese Patent Application No. 2014-205771, filed Oct. 6, 2014. The contents of these applications are incorporated herein by reference in their entirety.

BACKGROUND OF THE INVENTION

The present invention relates to an engine device.

There has been conventionally known a technique of purifying the exhaust gas discharged from the diesel engine by arranging a case inward provided with a diesel particulate filter (hereinafter, refer to as a DPF case), and a case inward provided with a urea selective reducing type catalyst (hereinafter, refer to as an SCR case), as an exhaust gas purification device (an exhaust gas aftertreatment device) in an exhaust channel of the diesel engine, and introducing the exhaust gas to the DPF case and the SCR case serving as the exhaust gas purification device (refer, for example, to Japanese Patent No. 4703260, Japanese Patent No. 4605205 and Japanese Patent No. 5020185).

SUMMARY OF THE INVENTION

In the structure which is provided with an exhaust gas connection pipe mixing urea water into the exhaust gas, and in which an exhaust gas inlet of an SCR case is connected to an exhaust gas connection pipe, such as the prior art, the exhaust gas connection pipe can be easily assembled in close vicinity to the SCR case. Further, in the structure in which a urea water injection portion is formed in the exhaust gas connection pipe, it is not necessary to specially install the urea water injection portion, and it is possible to simplify an attaching structure of the urea water injection portion.

However, in the structure in which the DPF case and the SCR case are installed to an upper surface side of the engine, the exhaust gas purification device having the exhaust gas connection pipe arranged in the upper side between the DPF case and the SCR case which are provided side by side is a heavy part, and a center of gravity of the engine exists at a high position. As a result, there are such problems that oscillation of the engine can not be easily lightened, a total height of the engine tends to be high, a vehicle body structure of a vehicle mounting the engine thereon is restricted, and it is impossible to easily improve a mounting property of the engine to a vehicle body or a general versatility of the engine.

Further, in the structure in which the exhaust gas purification device (the DPF case and the SCR case) is installed in the upper surface side of the engine, it is necessary to set a support mechanism such as a support leg body in the engine and mount the exhaust gas purification device to the engine upper surface side via the support mechanism. As a result, in the case that an engine suspension member for attaching and detaching the engine is provided, and the engine is moved in a suspended state via the engine suspension member for attaching and detaching the engine by using a material handling machine, an attachment position of the support mechanism or an attachment position of the engine suspension member tends to be restricted each other, and there is a problem that it is impossible to easily secure the attachment position of the support mechanism which is suitable for supporting the exhaust gas purification device, or the attachment position of the engine suspension member which is suitable for moving the engine in the suspended state. More specifically, there is a problem that it is impossible to easily use the engine suspension member in common for the engines having different specifications, as well as it is impossible to easily select an attachment layout of the support mechanism or the engine suspension member in correspondence to the specification of the exhaust gas purification device, or the structure of the engine.

Consequently, the invention aims at providing an engine device to which an improvement is applied by making a study of these actual conditions.

In order to achieve the object, an engine device according to the present invention is an engine device having an exhaust gas purification device which removes particulate matters in exhaust gas of an engine or nitrogen oxides in the exhaust gas of the engine, wherein the exhaust gas purification device is firmly fixed to a support base, and an exhaust gas outlet pipe of the engine is provided with an exhaust connection portion which connects an exhaust gas inlet of the exhaust gas purification device, and a support base connection portion which connects the support base.

The engine device may be structured such that the exhaust connection portion and the support base connection portion are formed in a staircase pattern, the exhaust connection portion and the support base connection portion being formed in parallel in an upper surface side of the exhaust gas outlet pipe of the engine, and an upper surface of the exhaust gas outlet pipe where the support base connection portion is formed is formed lower than an upper surface of the exhaust gas outlet pipe where the exhaust connection portion is formed, in the upper surface of the exhaust gas outlet pipe.

The engine device may be structured such that the exhaust gas purification device is provided with a DPF case which removes the particulate matters in the exhaust gas of the engine, an SCR case which removes the nitrogen oxides in the exhaust gas of the engine, and a urea mixing pipe which injects urea water into the exhaust gas of the engine, the upper surface of the support base is provided with a DPF case mounting portion which mounts the DPF case, and an SCR case mounting portion which mounts the SCR case, the DPF case and the SCR case are arranged side by side in the upper surface side of the support base, and an upper surface of the SCR case mounting portion of the support base is formed lower than an upper surface of the DPF case mounting portion of the support base in the upper surface of the support base.

The engine device may be structured such that an intake air manifold of the engine is provided with an exhaust gas recirculation device which supplies a part of the exhaust gas of the exhaust gas manifold, and an EGR cooler, the exhaust gas manifold is installed in a side surface of a cylinder head of the engine, a supercharger and the exhaust gas outlet pipe are arranged in close vicinity to an upper surface side of the exhaust gas manifold, and the EGR cooler is arranged in close vicinity to a lower surface side of the exhaust gas manifold.

An engine device according to the present invention is an engine device having an exhaust gas purification device which removes particulate matters in exhaust gas of an engine or nitrogen oxides in the exhaust gas of the engine, wherein the exhaust gas purification device is firmly fixed to a support base, the support base is mounted to the engine via a support leg body, and an engine suspension member for attaching and detaching the engine is firmly fixed to the support leg body.

The engine device may be structured such that a rear portion support leg body is provided as a support leg body for firmly fixing the engine suspension member, the rear portion support leg body is fastened to a side surface above a flywheel of the engine, in the side surface of the cylinder head of the engine, the rear portion support leg body is provided in a rising manner in the side surface in the flywheel installing side of the engine, and a plurality of bolts for fastening the engine suspension member are arranged in an outer side surface side of the rear portion support leg body in a diagonally vertical direction.

The engine device may be structured such that an intake air manifold of the engine is provided with an exhaust gas recirculation device which supplies a part of the exhaust gas of the exhaust gas manifold, and an EGR cooler, an EGR pipe for returning the exhaust gas is extended between the exhaust gas recirculation device and the EGR cooler, a spacer for the engine suspension member is provided in the support leg body, the engine suspension member is fastened to the spacer of the support leg body, and an arrangement space of the EGR pipe for returning the exhaust gas is formed between the support leg body and the engine suspension member.

The engine device may be structured such that a side portion support leg body and a rear portion support leg body are provided as a support leg body for firmly fixing the engine suspension member, a front portion engine suspension member is provided in the side portion support leg body, and a rear portion engine suspension member is provided in the rear portion support leg body.

According to the embodiment of the present invention, in the engine device having the exhaust gas purification device which removes the particulate matters in the exhaust gas of the engine or the nitrogen oxides in the exhaust gas of the engine, the exhaust gas purification device is firmly fixed to the support base, and the exhaust gas outlet pipe of the engine is provided with the exhaust connection portion which connects the exhaust gas inlet of the exhaust gas purification device, and the support base connection portion which connects the support base. As a result, it is possible to make a position of center of gravity of the engine low by lowering a support position of the exhaust gas purification device which is a heavy part in relation to the engine, it is possible to reduce the oscillation of the exhaust gas purification device, and it is possible to prevent damage of the exhaust gas purification. Further, it is possible to reduce the oscillation of the engine, and it is possible to easily secure a vehicle body strength of a vehicle to which the engine is mounted. Moreover, it is possible to inhibit the support attitudes of the exhaust gas inlet of the exhaust gas purification device and the support base from being restricted by each other, it is possible to easily select an installation layout of the exhaust gas purification device or the support base in correspondence to the specification of the exhaust gas purification device or the installation structure of the engine, and it is possible to improve the mounting property of the engine to the vehicle body or the general versatility of the engine.

According to the embodiment of the present invention, the exhaust connection portion and the support base connection portion are formed in the staircase pattern, the exhaust connection portion and the support base connection portion being formed in parallel in the upper surface side of the exhaust gas outlet pipe of the engine, and the upper surface of the exhaust gas outlet pipe where the support base connection portion is formed is formed lower than the upper surface of the exhaust gas outlet pipe where the exhaust connection portion is formed, in the upper surface of the exhaust gas outlet pipe. As a result, the exhaust connection portion and the support base connection portion can be formed by the parallel plane with step, it is possible to easily dissolve an attachment error between the exhaust gas inlet of the exhaust gas purification device and the support base by the spacer which is provided in the support base connection portion, and it is possible to simplify attachment height adjustment of the exhaust gas purification device or the support base. In addition, it is possible to form a support leg part for attaching the support base to the engine compactly, and it is possible to achieve weight saving, cost reduction, and rigidity improvement. Further, it is possible to reduce the parts number of the attaching structure of the exhaust gas purification device, and it is possible to improve an assembling rigidity of the exhaust gas purification device in spite that the manufacturing cost can be reduced.

According to the embodiment of the present invention, the exhaust gas purification device is provided with the DPF case which removes the particulate matters in the exhaust gas of the engine, the SCR case which removes the nitrogen oxides in the exhaust gas of the engine, and the urea mixing pipe which injects the urea water into the exhaust gas of the engine, the upper surface of the support base is provided with the DPF case mounting portion which mounts the DPF case, and the SCR case mounting portion which mounts the SCR case, the DPF case and the SCR case are arranged side by side in the upper surface side of the support base, and the upper surface of the SCR case mounting portion of the support base is formed lower than the upper surface of the DPF case mounting portion of the support base in the upper surface of the support base. As a result, it is possible to make the support position of the urea mixing pipe low by lowering the support position of the SCR case, in spite that it is possible to easily lighten the oscillation of the engine which is supported in an oscillation preventing manner to the vehicle body of the various vehicles, by lowering the support position of the exhaust gas purification device and setting the center of gravity of the engine to the low position. Therefore, it is possible to form a whole height of the engine low, it is possible to reduce the restriction of the vehicle body structure of the vehicle mounting the engine thereto, and it is possible to easily improve the mounting property of the engine to the vehicle body or the general versatility of the engine.

According to the embodiment of the present invention, the intake air manifold of the engine is provided with the exhaust gas recirculation device which supplies a part of the exhaust gas of the exhaust gas manifold, and the EGR cooler, the exhaust gas manifold is installed in the side surface of the cylinder head of the engine, the supercharger and the exhaust gas outlet pipe are arranged in close vicinity to the upper surface side of the exhaust gas manifold, and the EGR cooler is arranged in close vicinity to the lower surface side of the exhaust gas manifold. As a result, the exhaust gas purification device can be installed with low height to the upper surface side of the engine via the support base, an engine room of the vehicle mounting the engine thereto can be structured compactly, and it is possible to easily improve the mounting property of the engine to the vehicle body or the general versatility of the engine, in spite that the supercharger and the EGR cooler can be supported compactly to the engine side surface to which the exhaust gas manifold is installed.

According to the embodiment of the present invention, in the engine device having the exhaust gas purification device which removes the particulate matters in the exhaust gas of the engine or the nitrogen oxides in the exhaust gas of the engine, the exhaust gas purification device is firmly fixed to the support base, the support base is mounted to the engine via the support leg body, and the engine suspension member for attaching and detaching the engine is firmly fixed to the support leg body. As a result, the attachment position of the support leg body or the attachment position of the engine suspension member is not restricted each other, and it is possible to easily secure the attachment position of the support leg body which is suitable for supporting the exhaust gas purification device, or the attachment position of the engine suspension member which is suitable for moving the engine in a suspended state. It is possible to easily select the attachment layout of the support leg body or the engine suspension member in correspondence to the specification of the exhaust gas purification device or the structure of the engine, it is possible to easily select the installation layout of the exhaust gas purification device, the support base, or the engine suspension member, and it is possible to improve the mounting property of the engine to the vehicle body or the general versatility of the engine. Further, it is possible to easily use the engine suspension member in common for the engines having the different specifications, and it is possible to reduce the manufacturing cost by improving the general versatility of the engine suspension member.

According to the embodiment of the present invention, the rear portion support leg body is provided as the support leg body for firmly fixing the engine suspension member, the rear portion support leg body is fastened to the side surface above the flywheel of the engine, in the side surface of the cylinder head of the engine, the rear portion support leg body is provided in the rising manner in the side surface in the flywheel installing side of the engine, and a plurality of bolts for fastening the engine suspension member are arranged in the outer side surface side of the rear portion support leg body in the diagonally vertical direction. As a result, it is possible to arrange a plurality of bolts for fastening the engine suspension member at predetermined intervals even in the case that a fastening width of the engine suspension member is restricted. It is possible to form the fastening portion of the engine suspension member compactly while maintaining a connection strength of the engine suspension member.

According to the embodiment of the present invention, the intake air manifold of the engine is provided with the exhaust gas recirculation device which supplies a part of the exhaust gas of the exhaust gas manifold, and the EGR cooler, the EGR pipe for returning the exhaust gas is extended between the exhaust gas recirculation device and the EGR cooler, the spacer for the engine suspension member is provided in the support leg body, the engine suspension member is fastened to the spacer of the support leg body, and the arrangement space of the EGR pipe for returning the exhaust gas is formed between the support leg body and the engine suspension member. As a result, the EGR pipe for returning the exhaust gas can be extended in close vicinity to the outer peripheral surface of the engine, the EGR pipe for returning the exhaust gas can be supported in a low oscillation manner, and the EGR pipe for returning the exhaust gas can be protected by the engine suspension member by shielding the external side of the EGR pipe for returning the exhaust gas with the engine suspension member.

According to the embodiment of the present invention, the side portion support leg body and the rear portion support leg body are provided as the support leg body for firmly fixing the engine suspension member, the front portion engine suspension member is provided in the side portion support leg body, and the rear portion engine suspension member is provided in the rear portion support leg body. As a result, it is possible to fasten and fix the side portion support leg body and the front portion engine suspension member, and the rear portion support leg body and the rear portion engine suspension member respectively by securing a high rigidity attachment portion in a diagonal direction of the engine.

DESCRIPTION OF THE EMBODIMENTS

Figure 1:
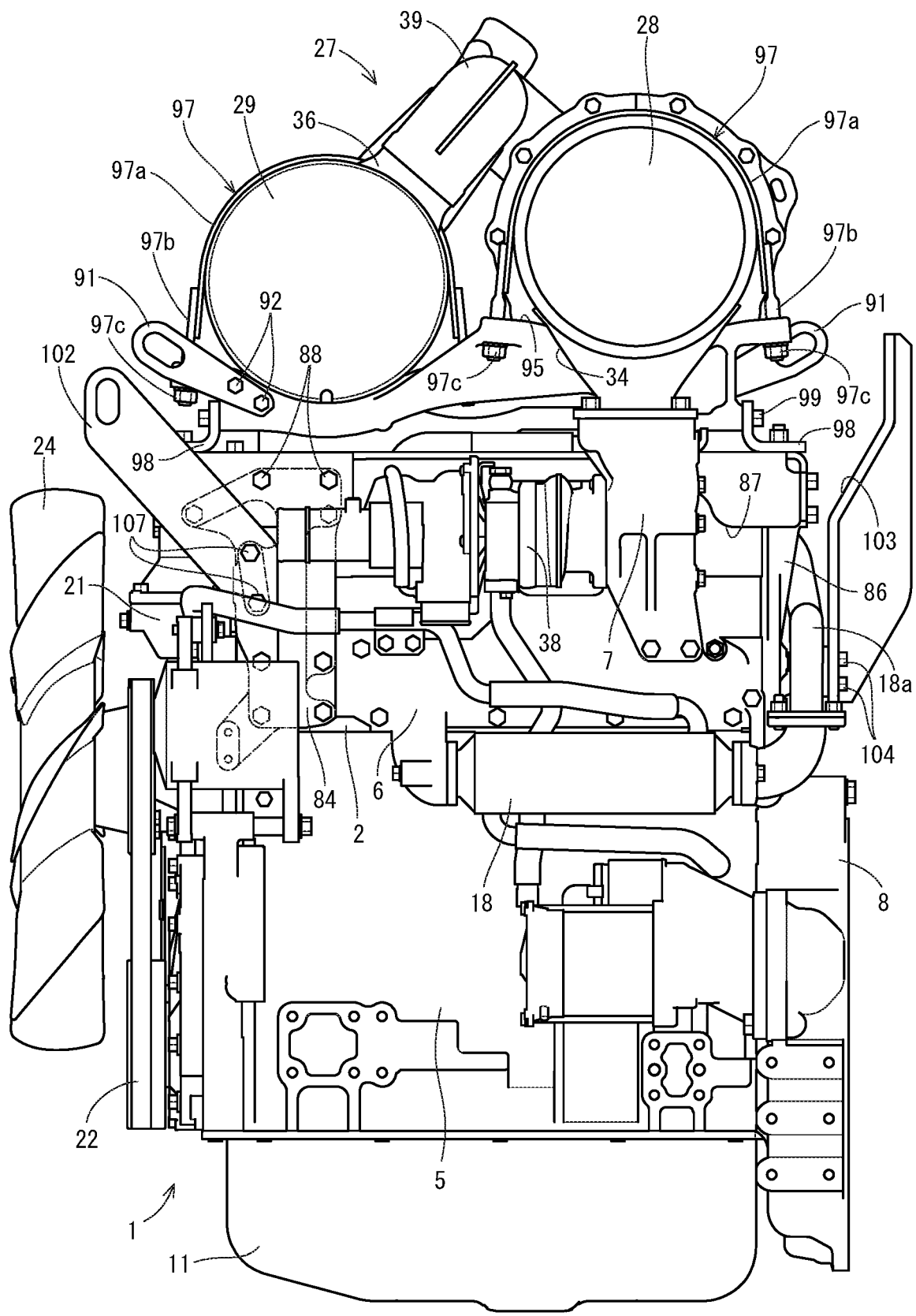
FIG. 1 is a left side elevational view of a diesel engine and shows a first embodiment.
Figure 2:
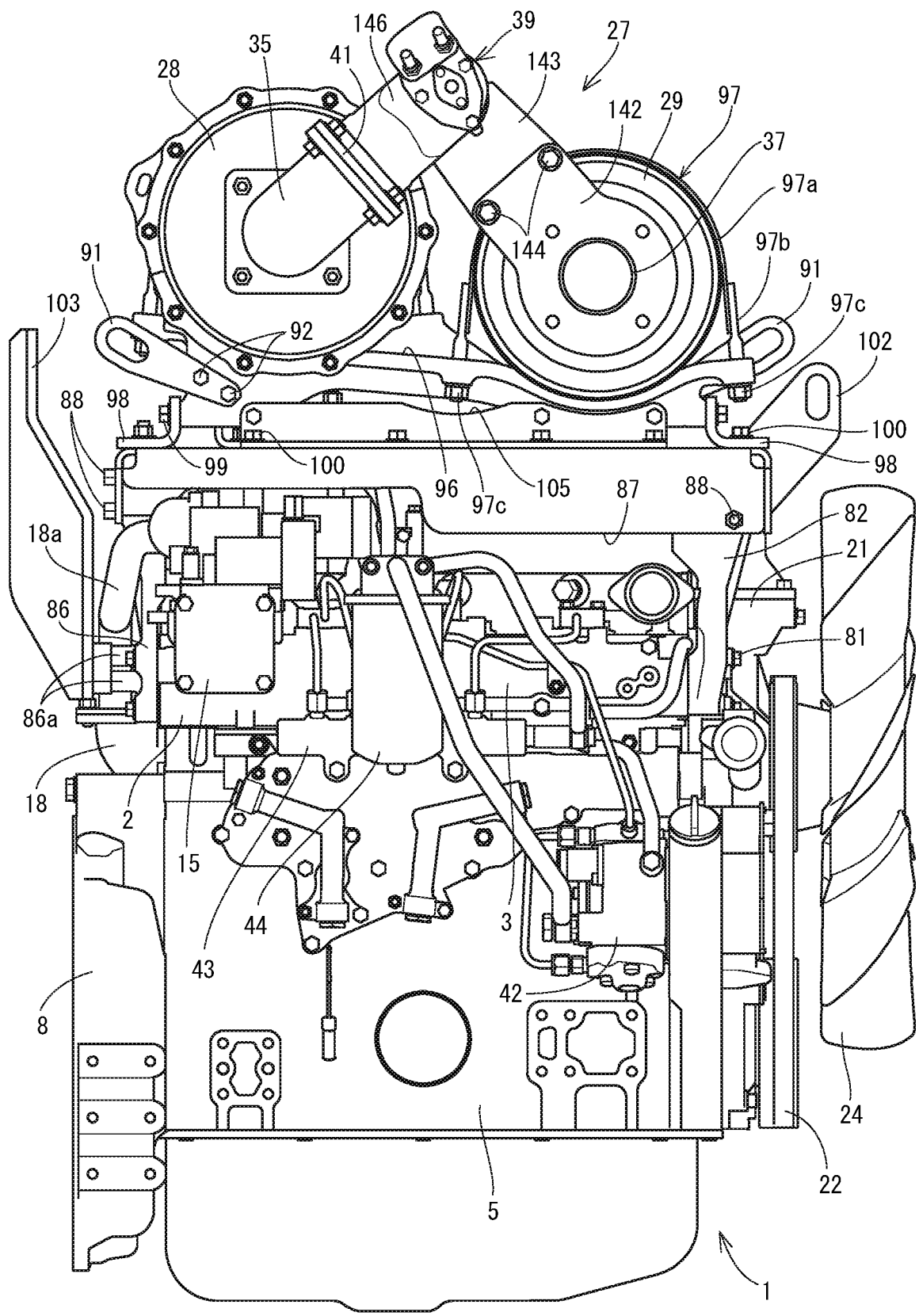
FIG. 2 is a right side elevational view of the same.
Figure 3:
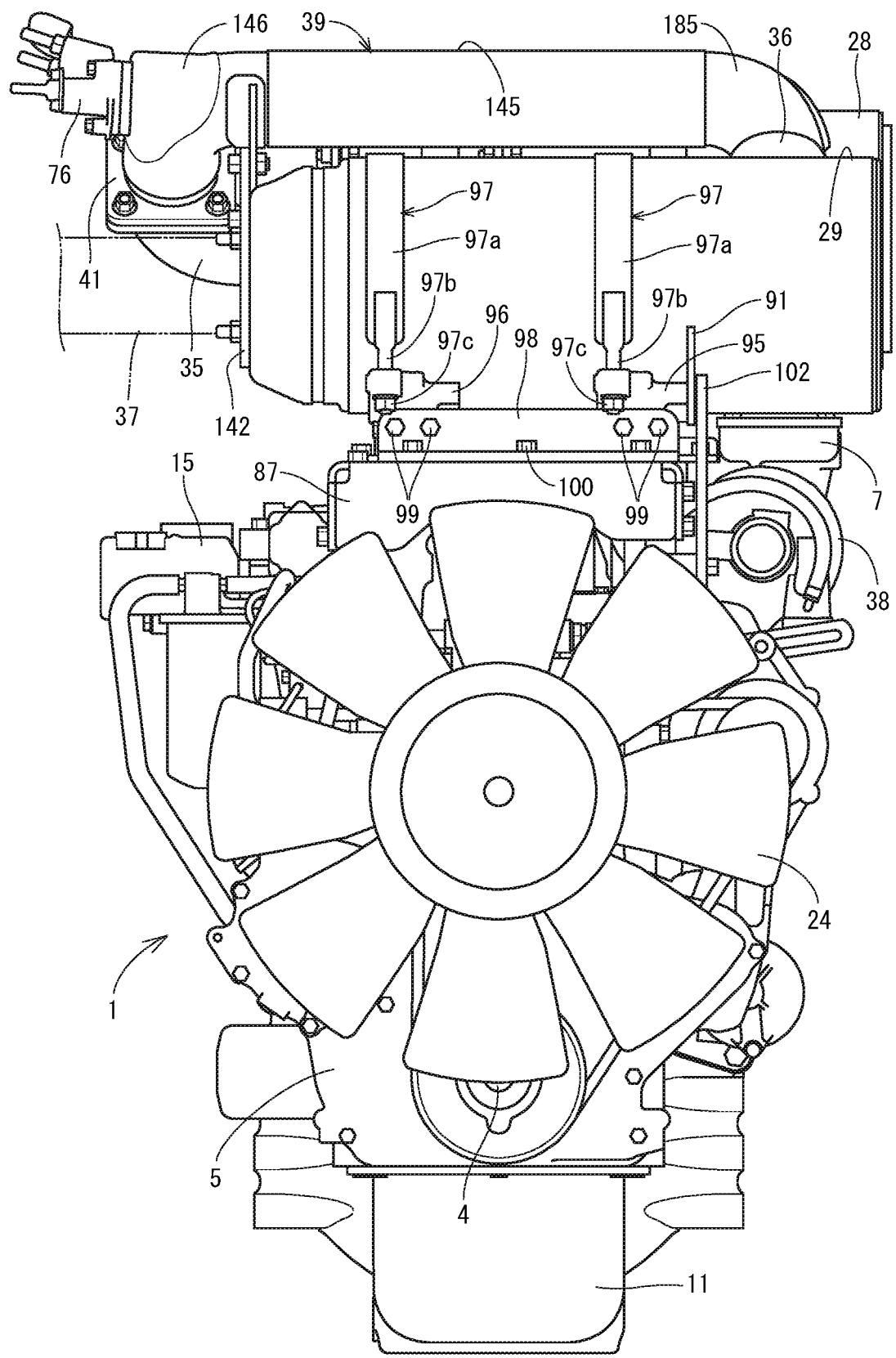
FIG. 3 is a front elevational view of the same.

A description will be given below of a first embodiment obtained by embodying the present invention with reference to the accompanying drawings (FIGS. 1 to 20). FIG. 1 is a left side elevational view of a diesel engine 1 in which an exhaust gas manifold 6 is installed, FIG. 2 is a right side elevational view of the diesel engine 1 in which an intake air manifold 3 is installed, and FIG. 3 is a front elevational view of the diesel engine 1 in which a cooling fan 24 is installed. A side in which the exhaust gas manifold 6 is installed is called as a left side surface of the diesel engine 1, a side in which the intake air manifold 3 is installed is called as a right side surface of the diesel engine 1, and a side in which the cooling fan 24 is installed is called as a front surface of the diesel engine 1.

A description will be given of a whole structure of the diesel engine 1 with reference to FIGS. 1 to 5. As shown in FIGS. 1 to 5, an intake air manifold 3 is arranged in one side surface of a cylinder head 2 of a diesel engine 1. The cylinder head 2 is mounted on a cylinder block 5 which has an engine output shaft 4 (a crank shaft) and a piston (not shown) built-in. An exhaust gas manifold 6 is arranged in the other side surface of the cylinder head 2. A front end and a rear end of the engine output shaft 4 are protruded out of a front surface and a back surface of the cylinder block 5.

As shown in FIGS. 1 to 5, a flywheel housing 8 is firmly fixed to the back surface of the cylinder block 5. A flywheel 9 is provided within the flywheel housing 8. The flywheel 9 is axially supported to the rear end side of the engine output shaft 4. Power of the diesel engine 1 is adapted to be taken out via the flywheel 9. Further, a sump 11 is arranged in a lower surface of the cylinder block 5.

As shown in FIGS. 2 to 5, an exhaust gas recirculation device (EGR) 15 taking into exhaust gas for recirculation is arranged in the intake air manifold 3. An air cleaner 16 (refer to FIG. 21) is connected to the intake air manifold 3. External air which is dust removed and purified by the air cleaner 16 is adapted to be fed to the intake air manifold 3, and be supplied to each of cylinders of the diesel engine 1.

According to the above structure, the exhaust gas discharged out of the diesel engine 1 to the exhaust gas manifold 6 is partly reflowed to each of the cylinders of the diesel engine 1 from the intake air manifold 3 via the exhaust gas recirculation device 15. As a result, a combustion temperature of the diesel engine 1 is lowered, a discharge amount of nitrogen oxides (NOx) from the diesel engine 1 is lowered, and a fuel consumption of the diesel engine 1 is improved.

Figure 21:
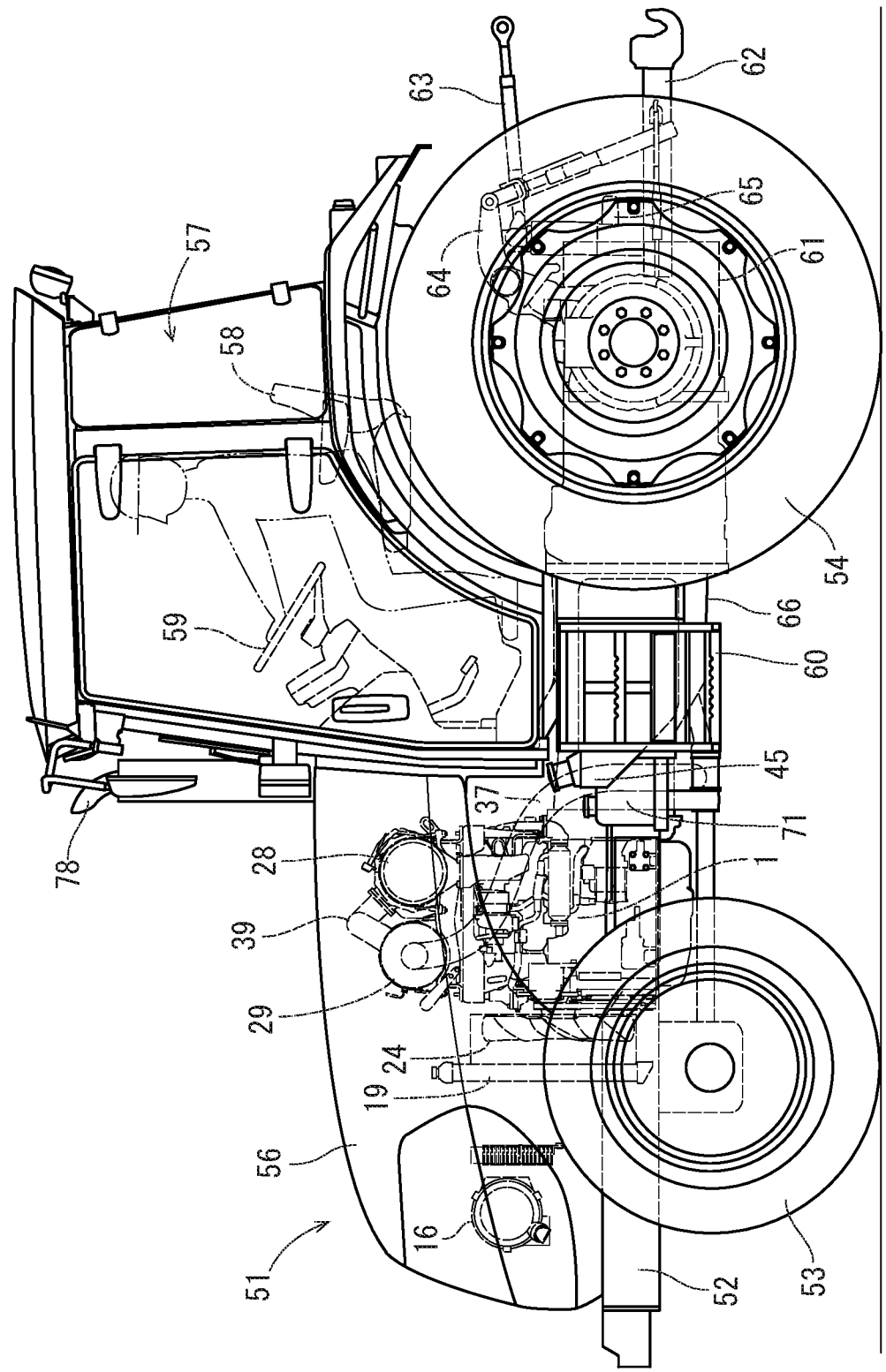
FIG. 21 is a left side elevational view of a tractor which mounts a diesel engine thereto.

A cooling water pump 21 is provided for circulating cooling water within the cylinder block 5 and in a radiator 19 (refer to FIG. 21). The cooling water pump 21 is arranged in a side where a cooling fan 24 is installed in the diesel engine 1. The cooling water pump 21 and the cooling fan 24 are coupled to the engine output shaft 4 via a V-belt 22, and the cooling water pump 21 and the cooling fan 24 are driven. The cooling water is fed into the cylinder block 5 from the cooling water pump 21 via an EGR cooler 18 which supplies the exhaust gas to the exhaust gas recirculation device 15, and the diesel engine 1 is adapted to be cooled by a wind of the cooling fan 24.

Figure 4:
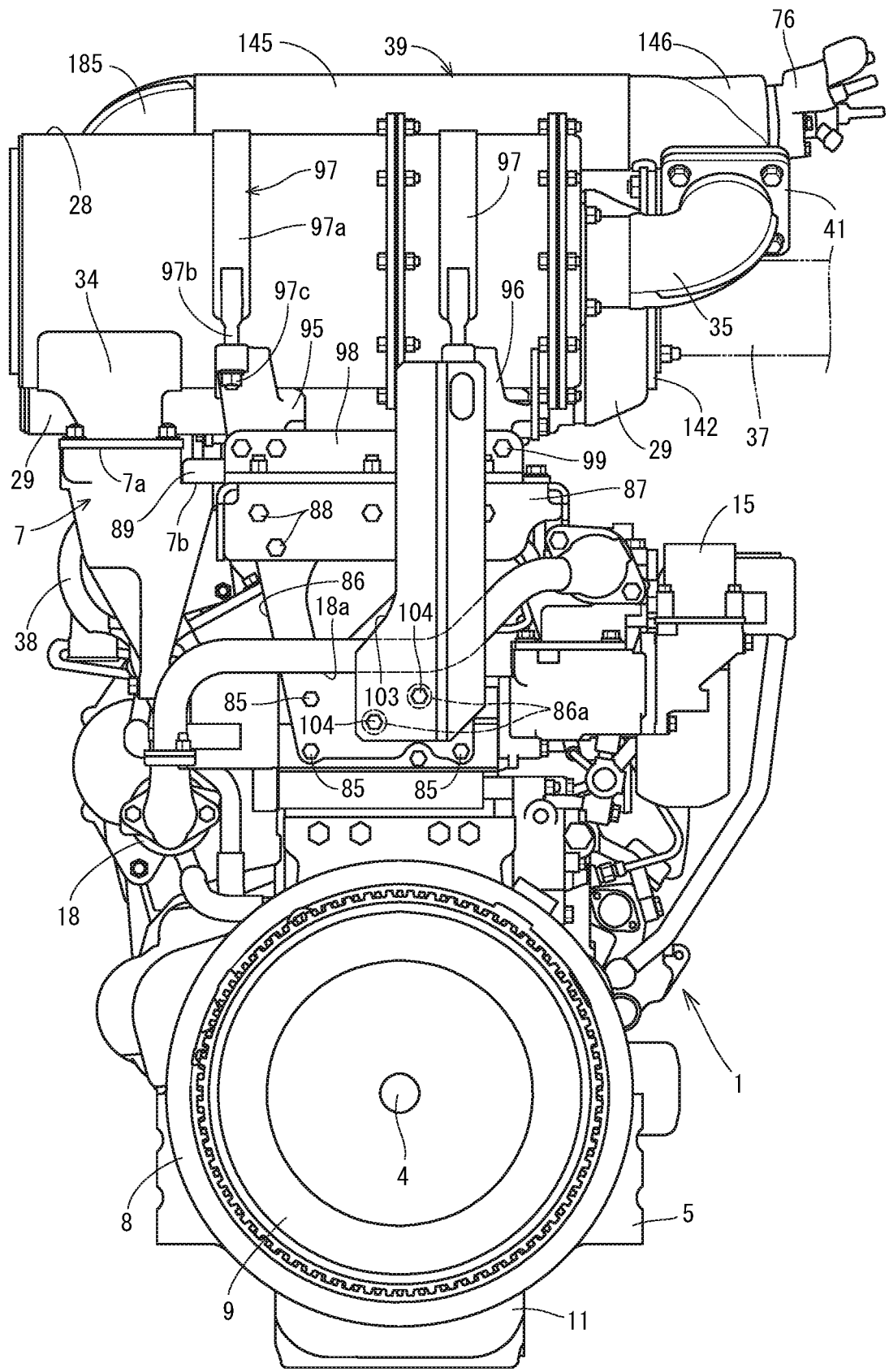
FIG. 4 is a back elevational view of the same.
Figure 5:
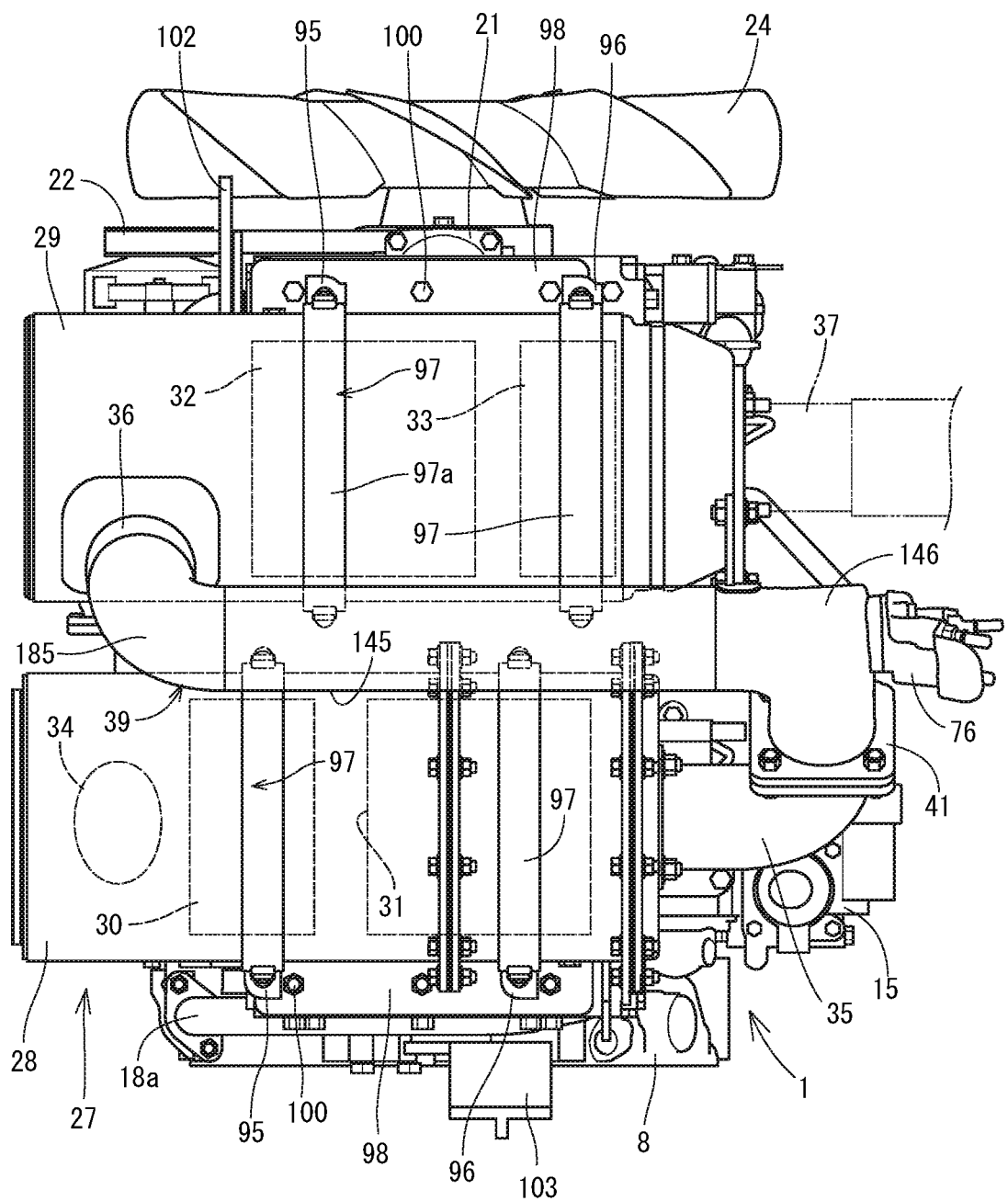
FIG. 5 is a plan view of the same.
Figure 6:
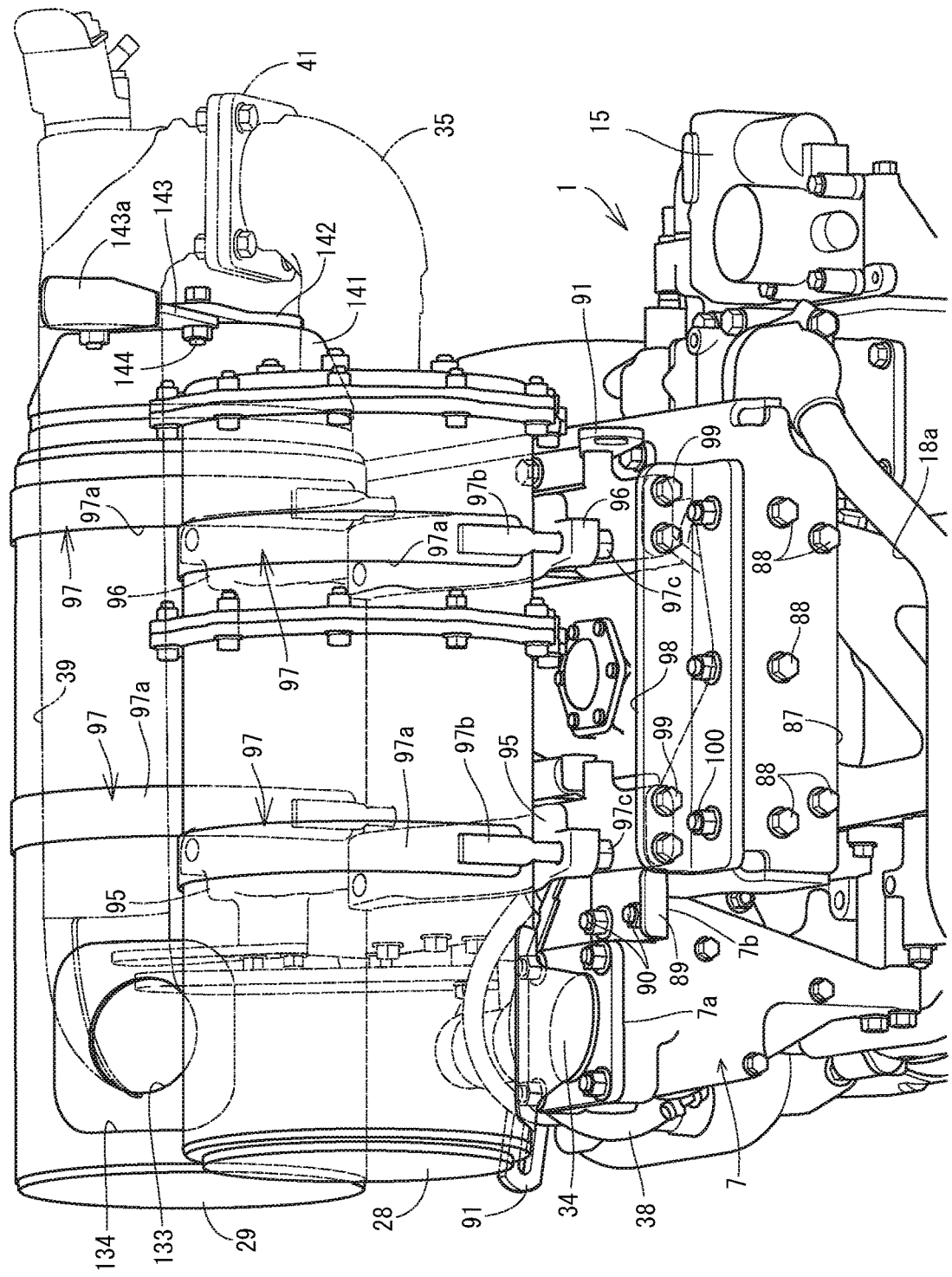
FIG. 6 is an explanatory view in a back elevational view of an upper portion of the same in a state in which an exhaust gas purification device is attached.
Figure 7:
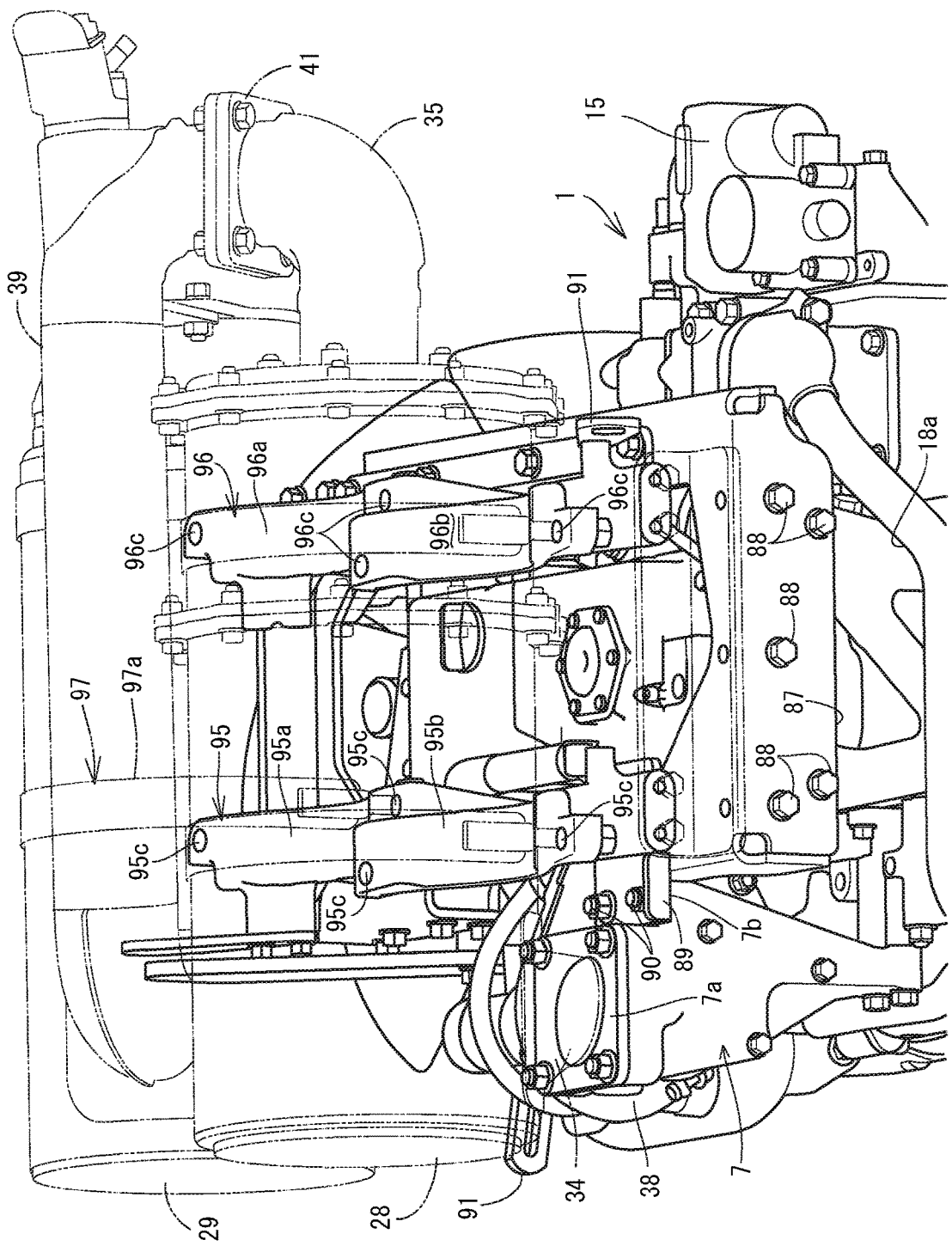
FIG. 7 is an explanatory view in a back elevational view of the upper portion of the same in a state in which the exhaust gas purification device is detached.
Figure 8:
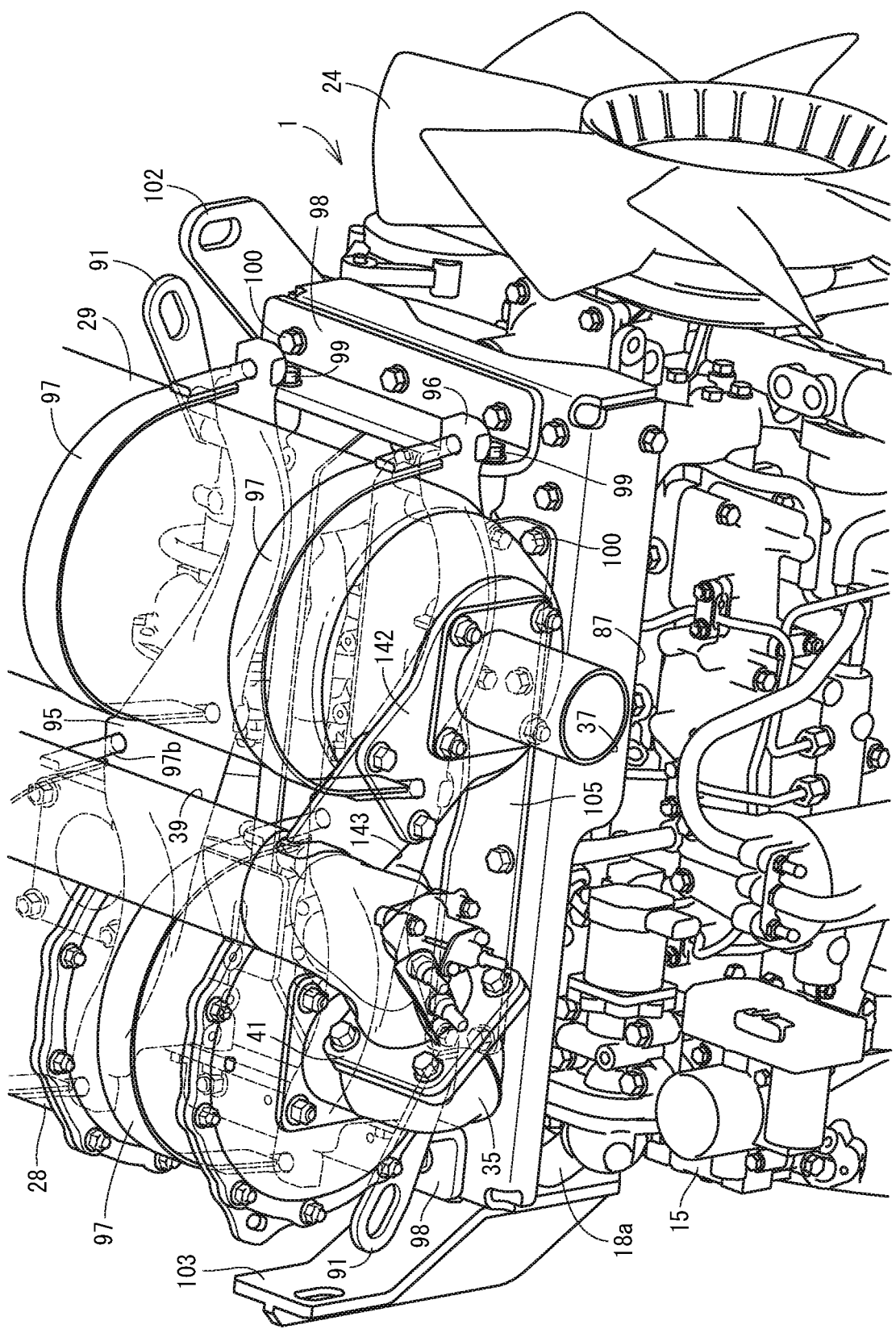
FIG. 8 is an explanatory view in a right side elevational view of the upper portion of the same in a state in which the exhaust gas purification device is attached.
Figure 9:
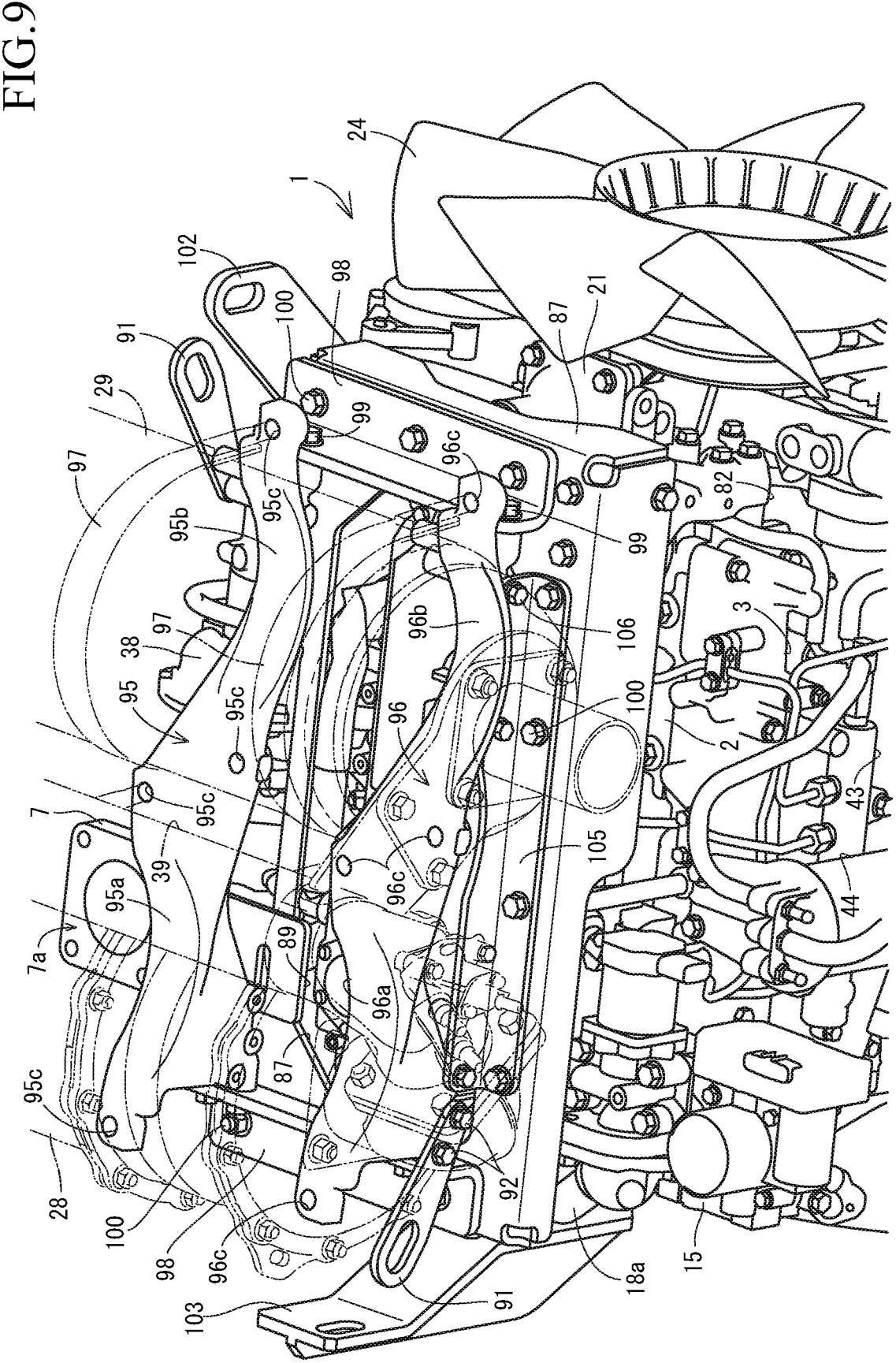
FIG. 9 is an explanatory view in a right side elevational view of the upper portion of the same in a state in which the exhaust gas purification device is detached.
Figure 10:
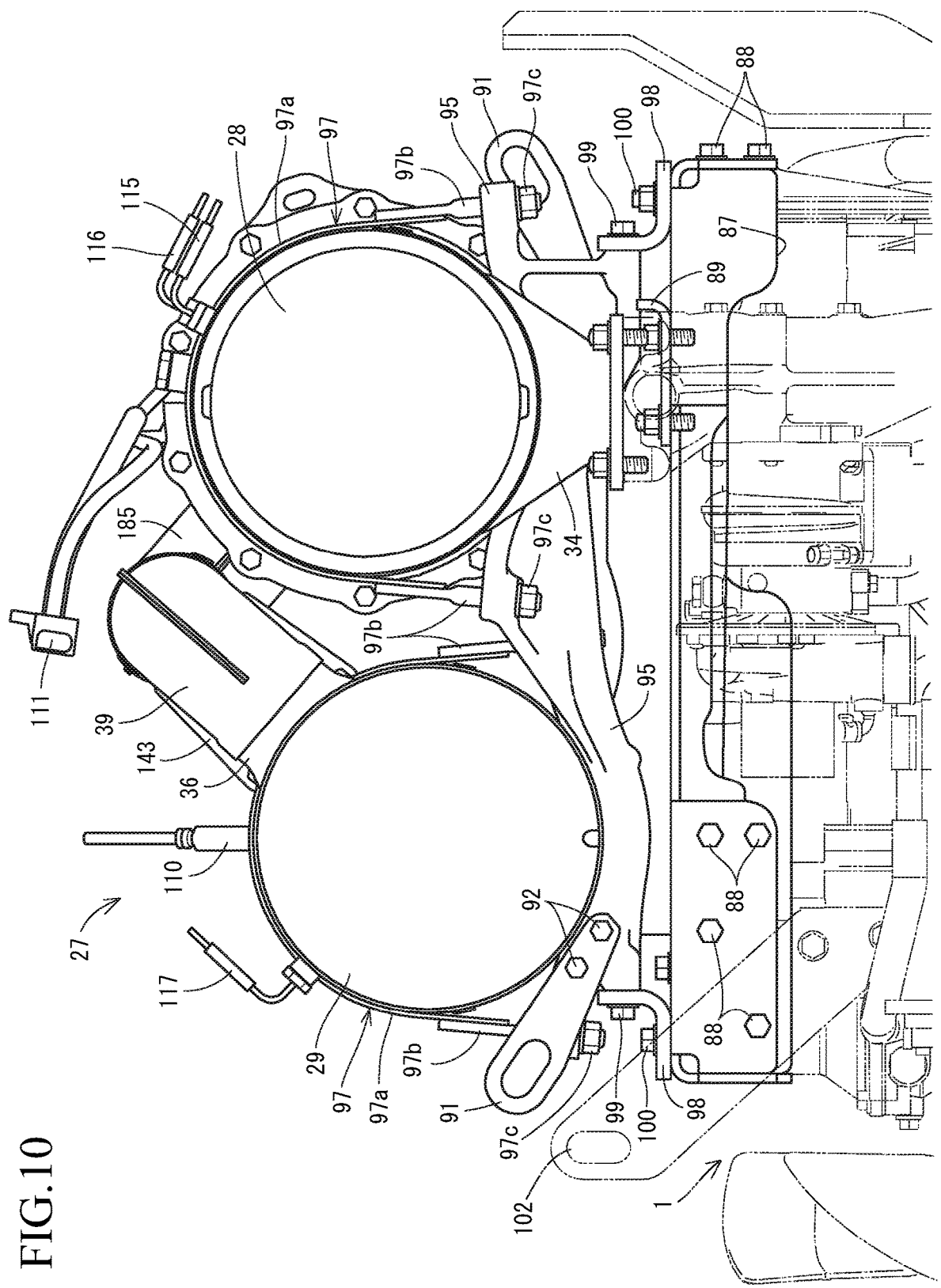
FIG. 10 is a left side elevational view of the exhaust gas purification device.

As shown in FIGS. 1 to 5, as an exhaust gas purification device 27 for purifying the exhaust gas discharged out of the cylinders of the diesel engine 1, there are provided a first case 28 serving as a diesel particulate filter (DPF) which removes particulate matters in the exhaust gas of the diesel engine 1, and a second case 29 serving as a urea selective catalyst reducing (SCR) system which removes nitrogen oxides in the exhaust gas of the diesel engine 1. As shown in FIG. 5, an oxidation catalyst 30 and a soot filter 31 are inward provided in the first case 28 serving as the DPF case.

An SCR catalyst 32 for reducing the urea selective catalyst and an oxidation catalyst 33 are inward provided in the second case 29 serving as the SCR case.

The exhaust gas discharged out of the cylinders of the diesel engine 1 to the exhaust gas manifold 6 is discharged outward via the exhaust gas purification device 27. The exhaust gas purification device 27 is adapted to reduce carbon monoxide (CO), carbon hydride (HC), particulate matters (PM), and nitrogen oxides (NOx) in the exhaust gas of the diesel engine 1.

As shown in FIGS. 3 to 5, the first case 28 and the second case 29 are formed into a long cylindrical shape which extends long in an orthogonal direction intersecting the output shaft (the crank shaft) 4 of the diesel engine 1 in a plan view. A DPF inlet pipe 34 taking into the exhaust gas, and a DPF outlet pipe 35 discharging the exhaust gas are provided in both sides (one end side and the other end side in an exhaust gas moving direction) of a tubular shape of the first case 28. In the same manner, an SCR inlet pipe 36 taking into the exhaust gas, and an SCR outlet pipe 37 discharging the exhaust gas are provided in both sides (one end side and the other end side in the exhaust gas moving direction) of the second case 29.

Further, a supercharger 38 forcibly feeding air into the diesel engine 1, and an exhaust gas outlet pipe 7 fastened by bolts to the exhaust gas manifold 6 are arranged in an exhaust gas outlet of the exhaust gas manifold 6. The exhaust gas of the diesel engine 1 is adapted to be introduced into the first case 28 by communicating the DPF inlet pipe 34 with the exhaust gas manifold 6 via the supercharger 38 and the exhaust gas outlet pipe 7. Meanwhile, the exhaust gas of the first case 28 is adapted to be introduced into the second case 29 by connecting the SCR inlet pipe 36 to the DPF outlet pipe 35 via a urea mixing pipe 39 mentioned later. In addition, the DPF outlet pipe 35 and the urea mixing pipe 39 are detachably connected by a DPF outlet side flange body 41 for fastening by bolts. The SCR inlet pipe 36 and the urea mixing pipe 39 are integrally connected by welding process.

As shown in FIG. 2, each of injectors (not shown) for multiple cylinders of the diesel engine 1 is provided with a fuel pump 42 to which a fuel tank 45 shown in FIG. 21 (FIG. 22) is connected and a common rail 43. The common rail 43 and a fuel filter 44 are arranged in a side where the intake air manifold 3 is installed in the cylinder head 2, and the fuel pump 42 is arranged in a cylinder block 5 below the intake air manifold 3. Each of the injectors has an electromagnetic opening and closing control type fuel injection valve (not shown).

The fuel within the fuel tank 45 is sucked into the fuel pump 42 via the fuel filter 44. Meanwhile, the common rail 43 is connected to the discharge side of the fuel pump 42, and the cylindrical common rail 43 is connected to each of the injectors of the diesel engine 1. A surplus of the fuel which is pressure fed to the common rail 43 from the fuel pump 42 is returned to the fuel tank 45, the high-pressure fuel is temporarily stored in the common rail 43, and the high-pressure fuel in the common rail 43 is supplied to an inner portion of each of the cylinders of the diesel engine 1.

According to the structure mentioned above, the fuel in the fuel tank 45 is pressure fed to the common rail 43 by the fuel pump 42, the high-pressure fuel is stored in the common rail 43, and the fuel injection valve in each of the injectors is controlled to be opened and closed. As a result, the high-pressure fuel in the common rail 43 is injected to each of the cylinders in the diesel engine 1. In other words, an injection pressure, an injection timing, and an injection period (an injection amount) of the fuel can be controlled with a high precision by electronically controlling the fuel injection valve in each of the injectors. Therefore, it is possible to reduce the nitrogen oxides (NOx) discharged out of the diesel engine 1.

Further, a description will be given of an attaching structure between the first case 28 and the second case 29 with reference to FIGS. 1 to 14. As shown in FIGS. 2, 4, 13, 17, and 18, there are provided a front portion support leg body 82 which is fastened by bolts 81 its lower end side to a right corner portion in a front surface of the cylinder head 2, a side portion leg body 84 which is fastened by bolts 83 its lower end side to a front corner portion in a left side surface of the cylinder head 2, and a rear portion support leg body 86 which is fastened by bolts 85 its lower end side to a rear surface of the cylinder head 2, and each of the support leg bodies 82, 84, and 86 is provided in a rising manner in the cylinder head 2. A rectangular support base 87 formed by sheet metal processing is provided, and side surfaces and an upper surface side of the support base 87 are fastened by bolts 88 to upper end sides of the support leg bodies 82, 84, and 86. Further, a tabular positioning body 89 is fixed by welding to the upper surface of the support base 87 which is provided in relation to the exhaust gas outlet pipe 7, a flat positioning step portion 7b is formed in the exhaust gas outlet pipe 7 in parallel to the flat exhaust gas outlet surface 7a of the exhaust gas outlet pipe 7 which is opened upwardly, a part of a tabular lower surface of the positioning body 89 is brought into surface contact with the positioning step portion 7b, and the positioning body 89 is fastened to the exhaust gas outlet pipe 7 by positioning bolts 90. The upper surface of the support base 87 is adapted to be approximately horizontal to the diesel engine 1 on the basis of a surface contact between the exhaust gas outlet pipe 7 (the flat upper surface of the positioning step portion 7b) and the flat lower surface of the positioning body 89.

As shown in FIGS. 1 to 14, 17, and 18, a pair of left case fixing body 95 and right case fixing body 96, and four fastening bands 97 having fastening bolts in both end sides are provided as a pinching body arranging the first case 28 and the second case 29 in parallel. The first case 28 is firmly fixed detachably to rear mounting portions 95a and 96a of the left case fixing body 95 and the right case fixing body 96 by a pair of right and left fastening bands 97, and the second case 29 is firmly fixed detachably to front mounting portions 95b and 96b of the left case fixing body 95 and the right case fixing body 96 by a pair of right and left fastening bands 97. Therefore, the cylindrical first case 28 and second case 29 which are long in a lateral direction are arranged in parallel in an upper surface side of the diesel engine 1, the first case 28 is positioned in the upper surface rear side (the rear mounting portions 95a and 96a) of the diesel engine 1, and the second case 29 is positioned in the upper surface front side (the front mounting portions 95b and 96b) of the diesel engine 1. The front mounting portions 95b and 96b are formed in the upper surface side of the diesel engine 1 to be lower than the rear mounting portions 95a and 96a, support heights of the first case 28 and the second case 29 are differentiated, and the urea mixing pipe 39 is supported at a low position of the upper surface of the diesel engine 1, so that the upper surface side height of the diesel engine 1 is adapted to be formable low.

As shown in FIGS. 6 to 14, front and rear support frame bodies 98 are fastened by bolts 99 to front and rear end portions of the left case fixing body 95 and the right case fixing body 96 so as to be adjustable their attachment positions (support attitudes), a side portion support frame body 105 is fastened by bolts 106 to a side surface of the right case fixing body 96 so as to be adjustable its attachment position (support attitude), the left and right case fixing bodies 95 and 96, the front and rear support frame bodies 98, and the side portion support frame body 105 are connected like a quadrangular frame shape, the front and rear support frame bodies 98 and the side portion support frame body 105 are fastened by bolts 100 to the upper surface of the support base 87, and the first case 28 and the second case 29 are firmly fixed to the upper surface of the support base 87 via the left and right case fixing bodies 95 and 96 and the fastening bands 97, thereby constructing the exhaust gas purification device 27 serving as the exhaust gas purification unit.

As shown in FIGS. 6 to 10, four fastening bands 97 are provided as a plurality of pinching bodies. The fastening band 97 has a belt-like fastening band main body 97a, and a fastening bolt 97b which is firmly fixed to both end sides of the fastening band main body 97a. In a state in which the fastening band main body 97a is wound around the first case 28 or the second case 29, a leading end side of the fastening bolt 97b is fitted and inserted to bolt holes 95c and 96c of the left case fixing body 95 and the right case fixing body 96, a fastening nut 97c is threadably attached to the leading end side of the fastening bolt 97b, and the first case 28 is firmly fixed to the rear mounting portions 95a and 96a of the left case fixing body 95 and the right case fixing body 96 via two left and right fastening bands 97. Further, the second case 29 is firmly fixed to the front mounting portions 95b and 96b of the left case fixing body 95 and the right case fixing body 96 via two left and right fastening bands 97, and the first case 28 and the second case 29 which are long in the lateral direction and are formed into the cylindrical shapes are arranged in a sideways falling attitude in the upper surface side of the diesel engine 1.

Further, left and right unit suspension members 91 are fastened by bolts 92 to a front end side of the left case fixing body 95 and a rear end side of the right case fixing body 96, the left and right unit suspension members 91 are arranged at diagonal positions of the quadrangular frame of the left and right case fixing bodies 95 and 96 and the front and rear support frame bodies 98, and the exhaust gas purification device 27 is adapted to be movable in a suspended state via the left and right unit suspension members 91 by using a material handling machine such as a hoist or a chain block. Meanwhile, a front portion engine suspension member 102 is fastened by bolts 107 to the side portion support leg body 84 which is provided in a left front portion of the cylinder head 2 of the diesel engine 1, a rear portion engine suspension member 103 is fastened by bolts 104 to the rear portion support leg body 86 which is provided in a back face portion of the cylinder head 2 of the diesel engine 1, and the diesel engine 1 is adapted to be movable in a suspended state via the front portion engine suspension member 102 and the rear portion engine suspension member 103 by using the material handling machine such as the hoist or the chain block.

In addition, as shown in FIGS. 1, 2, 4, and 17, a spacer 86a is formed in the rear portion support leg body 86, the spacer 86a is protruded out of back face of the rear portion support leg body 86 to a rear side, a lower end side of the rear portion engine suspension member 103 is fastened and fixed by bolts 104 to the spacer 86a of the rear portion support leg body 86, a back face of the rear portion support leg body 86 and a front face of the rear portion engine suspension member 103 are spaced at a dimension width of the spacer 86a (a pipe installation space), and an arrangement space (a pipe installation space) of the EGR pipe 18a for returning the exhaust gas is formed between the back face of the rear portion support leg body 86 and the front face of the rear portion engine suspension member 103. Further, the EGR pipe 18*a* for returning the exhaust gas is extended between the exhaust gas recirculation device 15 and the EGR cooler 18, a part of the exhaust gas of the exhaust gas manifold 6 is supplied to the exhaust gas recirculation device 15 (the intake air manifold 3) from the EGR cooler 18 via the EGR pipe 18*a*, an intermediate portion of the EGR pipe 18*a* for returning the exhaust gas is extended between the back face of the rear portion support leg body 86 and the rear portion engine suspension member 103 (the pipe installation space), and both end portions of the EGR pipe 18*a* for returning the exhaust gas are connected to the exhaust gas recirculation device 15 and the EGR cooler 18.

As shown in FIGS. 1 to 5 and 17, in the engine device having the exhaust gas purification device 27 which removes the particulate matters in the exhaust gas of the diesel engine 1, or the nitrogen oxides in the exhaust gas of the diesel engine 1, in which the exhaust gas purification device 27 is firmly fixed to the support base 87, the support base 87 is mounted to the diesel engine 1 via the support leg bodies 82, 84, and 86, and the engine suspension members 102 and 103 for attaching and detaching the engine 1 are firmly fixed to the support leg bodies 84 and 86. Therefore, since it is not necessary to arrange the attachment positions of the support leg bodies 84 and 86 or the attachment positions of the engine suspension members 84 and 86 in particular in the outer portion of the diesel engine 1, and the attachment positions of the support leg bodies 84 and 86 or the attachment positions of the engine suspension members 84 and 86 are not restricted by each other, it is possible to easily secure the attachment positions of the support leg bodies 84 and 86 which are suitable for supporting the exhaust gas purification device 27, or the attachment positions of the engine suspension members 102 and 103 which are suitable for moving the diesel engine 1 in a suspended state. It is possible to easily select the attachment layout of the support leg bodies 84 and 86 or the engine suspension members 102 and 103 in correspondence to the specification of the exhaust gas purification device 27 or the structure of the engine 1, it is possible to easily select the installation layout of the exhaust gas purification device 27, the support base 87, or the engine suspension members 102 and 103, and it is possible to improve the mounting property of the diesel engine 1 to the vehicle body or the general versatility of the diesel engine 1. Further, it is possible to easily use in common the engine suspension members 102 and 103 for the engines having different specifications, and it is possible to reduce a manufacturing cost by improving the general versatility of the engine suspension members 102 and 103.

As shown in FIGS. 1 to 5, in the structure in which the rear portion support leg body 86 is provided as the support leg body for firmly fixing the rear portion engine suspension member 103, the rear portion support leg body 86 is fastened to the side surface above the flywheel 9 of the diesel engine 1 in the side surface of the cylinder head 2 of the diesel engine 1, and the rear portion support leg body 86 is provided in a rising manner in the side surface in the installation side of the flywheel 9 of the engine 1, a plurality of bolts 104 for fastening the rear portion engine suspension member 103 are arranged in a diagonally vertical direction in the outer side surface side of the rear portion support leg body 86. Therefore, even in the case that the fastening width of the rear portion engine suspension member 103 is restricted, it is possible to arrange a plurality of bolts 104 for fastening the rear portion engine suspension member 103 at predetermined intervals. It is possible to compactly form the fastening portion of the bolt 104 in the rear portion engine suspension member 103 while maintaining a connection strength of the rear portion engine suspension member 103.

As shown in FIGS. 1 to 5 and 17, in the structure in which there are provided the exhaust gas recirculation device 15 supplying a part of the exhaust gas of the exhaust gas manifold 6 to the intake air manifold 3 of the diesel engine 1, and the EGR cooler 18, and the EGR pipe 18*a* for returning the exhaust gas is extended between the exhaust gas recirculation device 15 and the EGR cooler 18, the spacer 86*a* for the rear portion engine suspension member 103 is provided in the rear portion support leg body 86, the rear portion engine suspension member 103 is fastened to the spacer 86*a* of the rear portion support leg body 86, and a space for arranging the EGR pipe 18*a* for returning the exhaust gas is formed between the rear portion support leg body 86 and the engine suspension member 103. Therefore, the EGR pipe 18*a* for returning the exhaust gas can be extended in close vicinity to the outer peripheral surface of the diesel engine 1, the EGR pipe 18*a* for returning the exhaust gas can be supported with low oscillation, and the EGR pipe 18*a* for returning the exhaust gas can be protected by the rear portion engine suspension member 103 by shielding the external side of the EGR pipe 18*a* for returning the exhaust gas with the rear portion engine suspension member 103.

As shown in FIGS. 1 to 5 and 17, the side portion support leg body 84 and the rear portion support leg body 86 are provided as the support leg body for firmly fixing the engine suspension members 102 and 103, the front portion engine suspension member 102 is provided in the side portion support leg body 84, and the rear portion engine suspension member 103 is provided in the rear portion support leg body 86. Therefore, it is possible to compactly fasten and fix the side portion support leg body 84 and the front portion engine suspension member 102, and the rear portion support leg body 86 and the rear portion engine suspension member 103 by securing the high rigidity attaching portion in the diagonal direction of the diesel engine 1.

Figure 15:
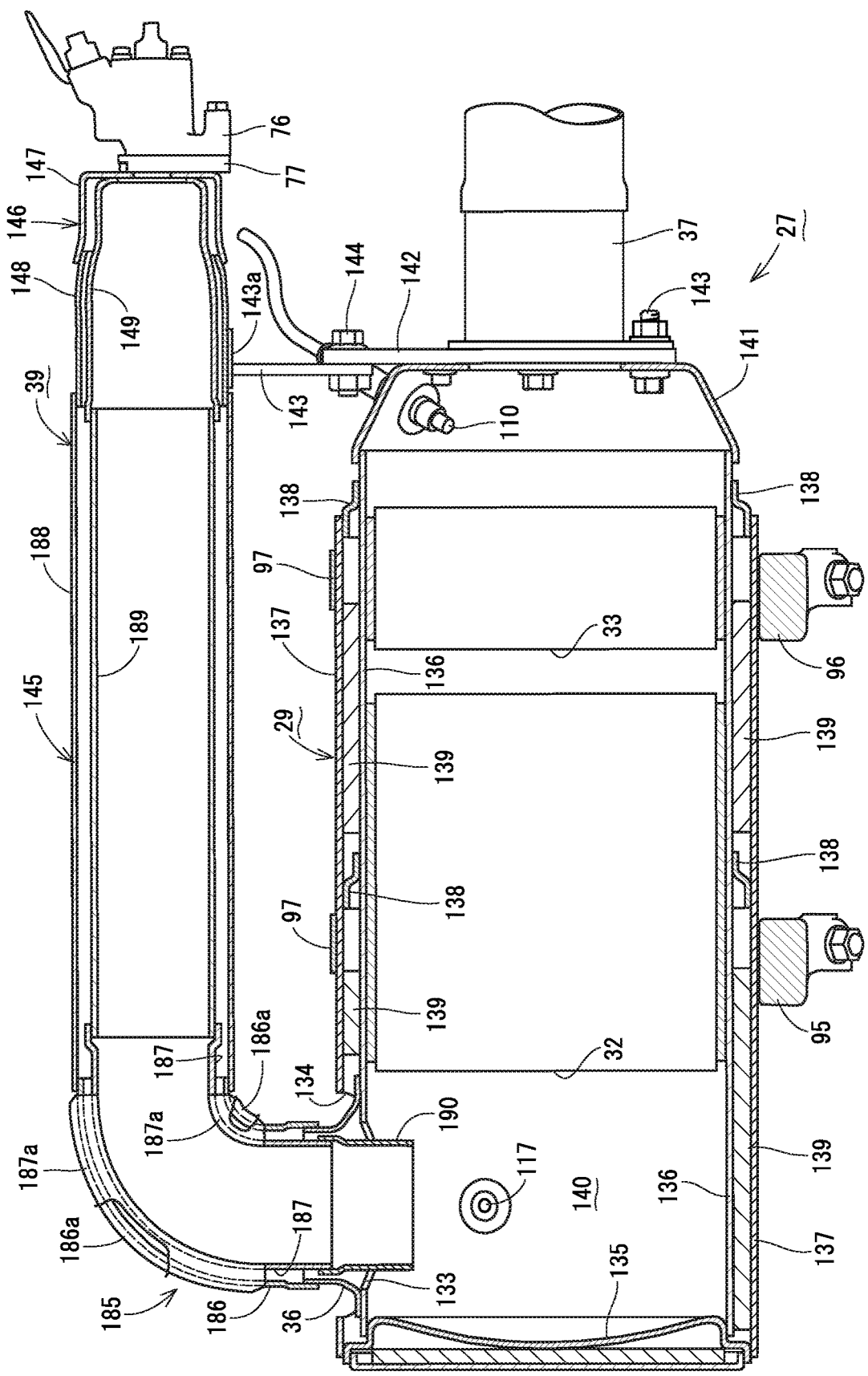
FIG. 15 is an explanatory view of a cross section of a second case and a urea mixing pipe.

Next, a description will be given of a structure of the second case 29 and the urea mixing pipe 39 with reference to FIGS. 3, 15, and 16. As shown in FIGS. 3 and 15, the urea mixing pipe 39 is formed by a straight tubular portion 145 which forms ammonia according to a hydrolysis of the urea, a urea water injection portion 146 which is provided in an exhaust gas upstream side end portion of the straight tubular portion 145, and an elbow tubular portion 185. An exhaust gas inlet side of the urea water injection portion 46 is fastened by bolts to an exhaust gas outlet side of a DPF outlet pipe 35 by the DPF outlet side flange body 41, an exhaust gas inlet side of the straight tubular portion 145 is fixed by welding to an exhaust gas outlet side of the urea water injection portion 146, and an exhaust gas inlet side of the elbow tubular portion 185 is fixed by welding to an exhaust gas outlet side of the straight tubular portion 145, thereby moving the exhaust gas from the first case 28 to the urea mixing pipe 39.

Figure 16:
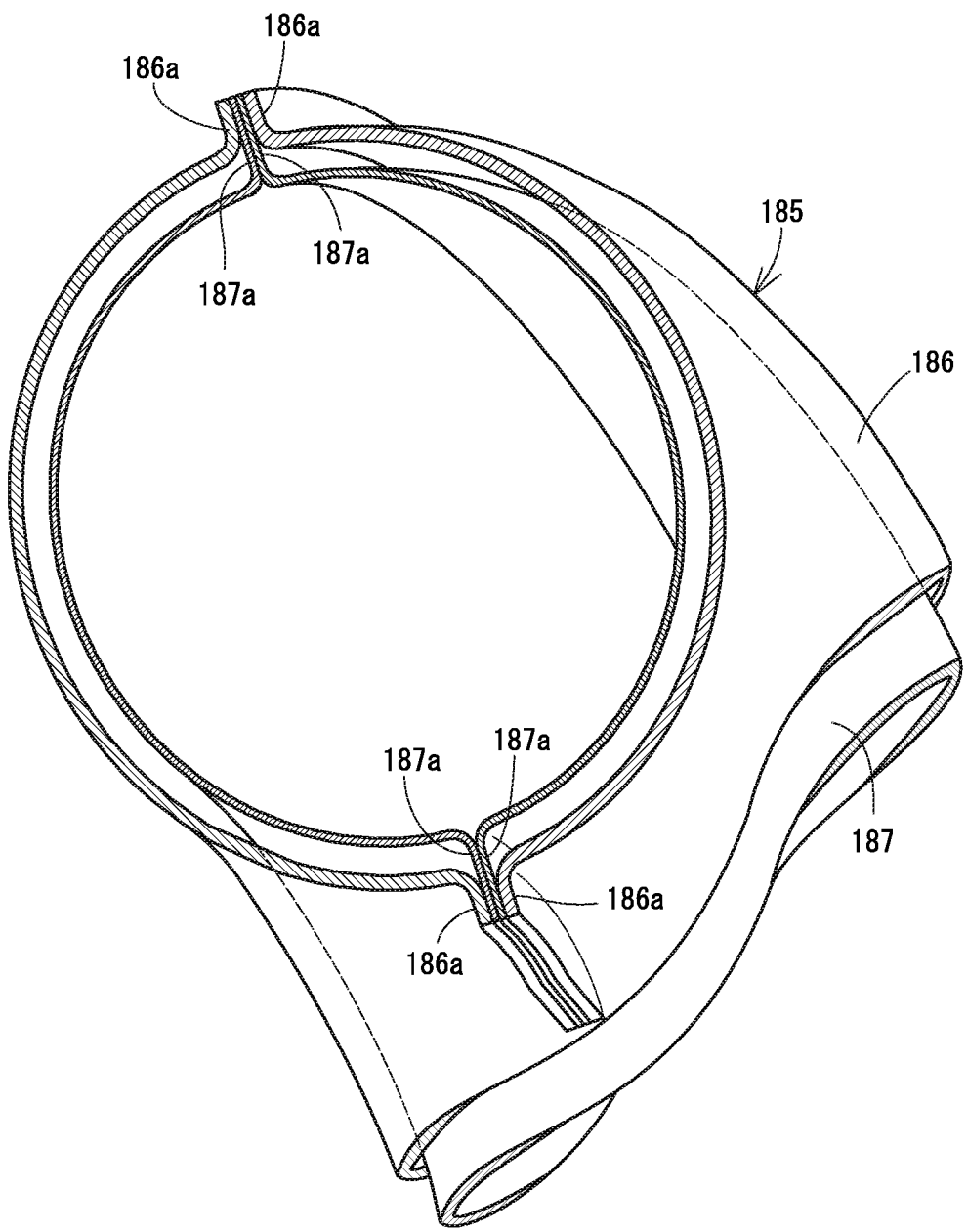
FIG. 16 is an explanatory view of a cross section of the urea mixing pipe.
Figure 17:
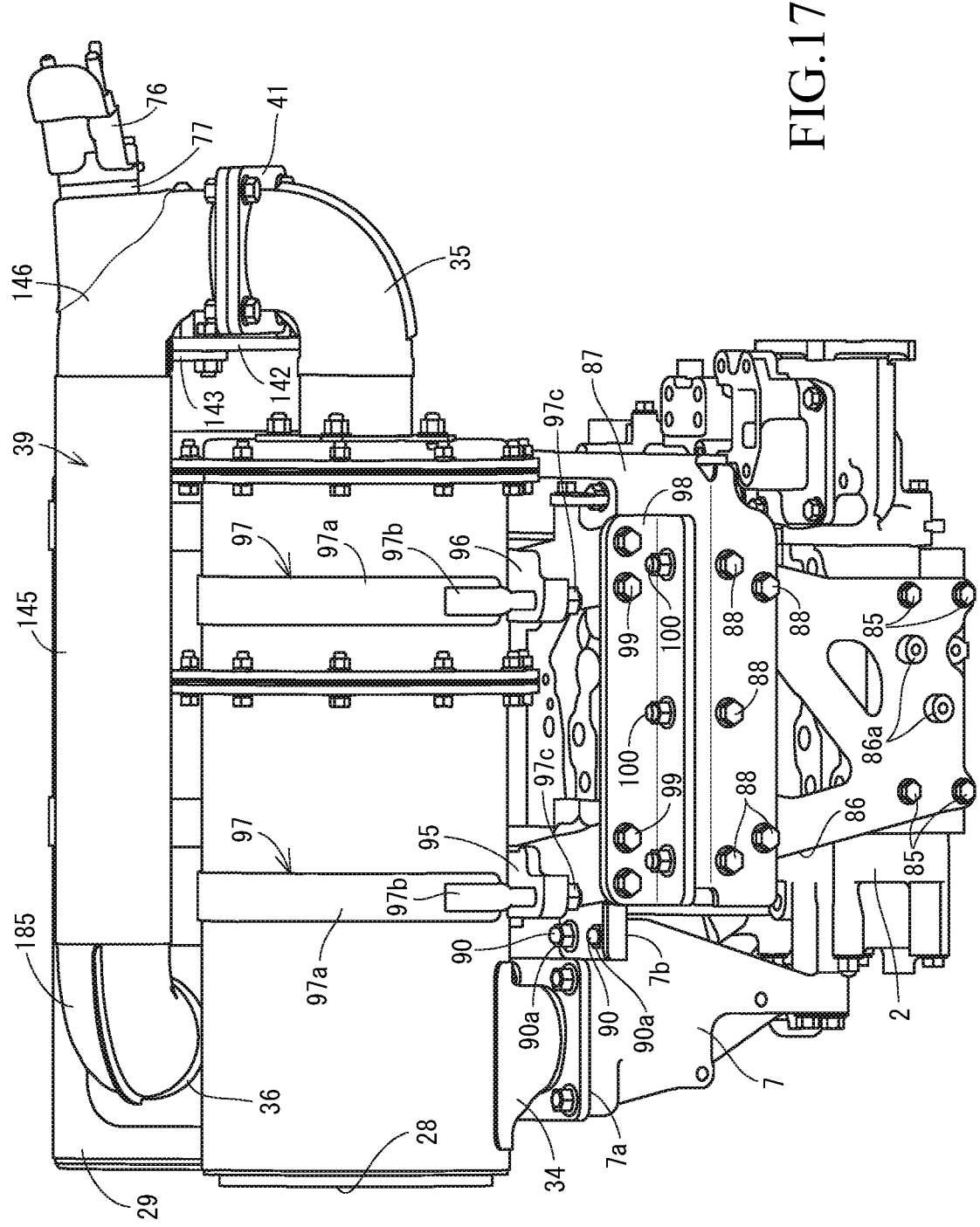
FIG. 17 is an explanatory view of a back elevation of the exhaust gas purification device and a cylinder head support portion.

As shown in FIGS. 15 and 16, the elbow tubular portion 185 has an elbow outer pipe 186 which is formed by a pair of halved tube bodies obtained by dividing a cylinder into two sections in a longitudinal direction, and a connection flange portion 186*a* is formed in the portion by folding end portions in the longitudinal direction of the halved tube bodies of the elbow outer pipe 186 outward. In the same manner, the elbow tubular portion 185 has an elbow inner pipe 187 which is formed by a pair of halved tube bodies obtained by dividing a cylinder into two sections in a longitudinal direction, and a connection flange portion 187*a* is formed in the portion by folding end portions in the longitudinal direction of the halved tube bodies of the elbow inner pipe 187 outward. Further, the elbow outer pipe 186 and the elbow inner pipe 187 of the elbow tubular portion 185 are integrally formed by pinching the connection flange portion 187*a* of the elbow inner pipe 187 by the connection flange portion 186*a* of the elbow outer pipe 186 so as to fix by welding.

As shown in FIG. 15, the straight tubular portion 145 of the urea mixing pipe 39 has a mixing outer pipe 188 and a mixing inner pipe 189 of a double pipe structure. A pipe length of the mixing inner pipe 189 is formed shorter than a pipe length of the mixing outer pipe 188. An exhaust gas inlet side of the elbow inner pipe 187 is protruded out of a cylindrical opening in an exhaust gas inlet side of the elbow outer pipe 186 in the elbow tubular portion 185, the exhaust gas inlet side of the elbow outer pipe 186 is fixed by welding to an exhaust gas outlet side of the mixing outer pipe 188, and the exhaust gas inlet side of the elbow tubular portion 185 is connected to the exhaust gas outlet side of the straight tubular portion 145 by fixing by welding the exhaust gas inlet side of the elbow inner pipe 187 to the exhaust gas outlet side of the mixing inner pipe 189. More specifically, the exhaust gas inlet side of the elbow tubular portion 185 is integrally connected to the exhaust gas outlet side of the urea mixing pipe 39.

In addition, the exhaust gas outlet side of the elbow inner pipe 187 is protruded out of the cylindrical opening in the exhaust gas outlet side of the elbow outer pipe 186 in the elbow tubular portion 185, the exhaust gas outlet side of the elbow outer pipe 186 is fixed by welding to the exhaust gas inlet side of the SCR inlet pipe 36, and an exhaust gas inlet side of an extension pipe 190 is fixed by welding to the exhaust gas outlet side of the elbow inner pipe 187.

Further, as shown in FIG. 15, the second case 29 is formed into a double pipe structure by an inner case 136 and an outer case 137. An SCR catalyst 32 and an oxidation catalyst 33 for urea selective catalyst reducing are accommodated in the inner case 136. An outer peripheral side of the inner case 136 and an inner peripheral side of the outer case 137 are connected via a support body 138 having a ring shape and made of a thin plate. A case heat insulation material 139 made of heat resisting fiber is filled between the outer peripheral side of the inner case 136 and the inner peripheral side of the outer case 137.

As shown in FIG. 15, an inlet side lid body 135 is fixed by welding to one end side (an end portion in an exhaust gas upstream side) of the inner case 136 and the outer case 137. One end sides of tubular opening portions of the inner case 136 and the outer case 137 are closed by the inlet side lid body 135. Further, exhaust gas inlets 133 and 134 are formed in the inner case 136 and the outer case 137 between the SCR catalyst 32 accommodation portion and the inlet side lid body 135. The exhaust gas inlet 134 of the outer case 137 is formed larger in diameter than the exhaust gas inlet 133 of the inner case 136, and the exhaust gas outlet side of the SCR inlet pipe 36 is fixed by welding to the outer peripheral side of the exhaust gas inlet 133 of the inner case 136.

More specifically, the inner tube 187 of the elbow tubular portion 185 is formed smaller in diameter than the inlet opening of the inner case 136, and the outlet opening of the SCR inlet pipe 36 is formed larger in diameter than the inlet opening of the SCR inlet pipe 36. The SCR inlet pipe 36 is passed through the exhaust gas inlet 134 of the outer case 137, and the inner portion of the SCR inlet pipe 36 is communicated with the inner side of the inner case 136. An exhaust gas supply chamber 140 of the second case 29 is formed in an inner portion of the inner case 136 between the SCR catalyst 32 and the inlet side lid body 135, and the exhaust gas outlet side of the inner pipe 187 in the elbow tubular portion 185 is protruded out of the exhaust gas inlet side of the extension pipe 190 protruded to the exhaust gas outlet side of the SCR inlet pipe 36, toward an inner portion of the exhaust gas supply chamber 140.

According to the structure mentioned above, the exhaust gas supply chamber 140 of the second case 29 is formed between an exhaust gas acceptance end surface of the SCR catalyst 32 and the inlet side lid body 135 obtained by depressing an opposing surface to the SCR catalyst 32 into a concave surface. The exhaust gas mixed with the urea water as the ammonia is put into the exhaust gas supply chamber 140 from the inner pipe 187 of the elbow tubular portion 185, and the exhaust gas is passed to the inner portions of the SCR catalyst 32 and the oxidation catalyst 33, thereby reducing the nitrogen oxides (NOx) in the exhaust gas which is discharged out of the SCR outlet pipe 37 of the second case 29.

As shown in FIGS. 1, 15, and 16, in the engine device having the urea mixing pipe 39 which injects the urea water into the exhaust gas of the engine 1, and the second case 29 serving as the SCR case which removes the nitrogen oxides in the exhaust gas of the engine 1, and in which the inlet side of the second case 29 is connected to the outlet side of the urea mixing pipe 39, the engine device being structured such that the urea mixing pipe 39 is formed by the elbow outer pipe 186 and the elbow inner pipe 187 having the double pipe structure, and the second case 29 is formed by the inner case 136 body and the outer case 137 body having the double case structure, the exhaust gas outlet side end portion of the elbow outer pipe 186 is connected to the exhaust gas inlet 133 of the inner case 136 body, and the exhaust gas outlet side end portion of the elbow inner pipe 187 is protruded to the inner portion of the second case 29. Therefore, it is possible to prevent the elbow inner pipe 187 from coming into contact with the outside air, and it is possible to reduce the formation of the crystal lump of the urea component in the inner hole surface of the elbow inner pipe 187. It is possible to easily prevent the exhaust gas resistance of the elbow inner pipe 187 from being increased by the growth of the urea crystal lump.

As shown in FIG. 15, the exhaust gas outlet side end portion of the elbow outer pipe 186 is formed larger in diameter than the inlet opening of the inner case 136 body, and the exhaust gas outlet side end portion of the elbow outer pipe 186 is fixed by welding to the outer peripheral surface of the inner case 136 body. Therefore, the exhaust gas outlet side end portion of the elbow outer pipe 186 can be connected to the outer peripheral surface which is spaced from the inlet opening edge of the inner case 136 body in the outer peripheral surface of the inner case 136 body. More specifically, the elbow outer pipe 186 (the exhaust gas outlet side end portion) can be firmly fixed easily by welding process to the outer peripheral surface of the inner case 136 body while preventing the deformation of the inner case 136 body, and the exhaust gas outlet side end portion of the elbow outer pipe 186 can be connected with high rigidity to the outer peripheral surface of the inner case 136 body so as to be spaced from the inlet opening edge of the inner case 136 body, thereby improving a connection strength between the outer peripheral surface of the inner case 136 body and the exhaust gas outlet side end portion of the elbow outer pipe 186.

As shown in FIGS. 15 and 16, the elbow outer pipe 186 and the elbow inner pipe 187 are formed into a split structure, and are integrally structured by pinching a split connection portion of the elbow inner pipe 187 by a split connection portion of the elbow outer pipe 186. Therefore, it is not necessary to specially arrange a support member of the elbow inner pipe 187, and it is possible to prevent the crystal lump of the urea component from being formed in the vicinity of the exhaust gas inlet of the second case 29 while simplifying the pipe structure. It is possible to easily prevent contact between the exhaust gas outlet side end portion of the elbow inner pipe 187 which is protruded out of the elbow outer pipe 186 into the inner portion of the second case 29, and the exhaust gas inlet opening edge of the second case 29.

As shown in FIG. 15, the exhaust gas outlet side of the SCR inlet pipe 36 serving as the exhaust gas inlet pipe is firmly fixed to the inlet opening portion of the inner case 136 body, the exhaust gas inlet side of the SCR inlet pipe 36 is firmly fixed to the exhaust gas outlet side end portion of the elbow outer pipe 186, the exhaust gas inlet side of the extension pipe 190 is connected to the exhaust gas outlet side end portion of the elbow inner pipe 187, and the exhaust gas outlet side of the extension pipe 190 is protruded into the inner portion of the inner case 136 body. Therefore, the urea mixing pipe 39 can be connected to the second case 29 without bringing the elbow inner pipe 187 (the exhaust gas) into contact with the connection portion (the exhaust gas inlet pipe) between the second case 29 and the elbow outer pipe 186, and it is possible to prevent the urea crystal lump from being formed in the vicinity of the second case 29 inlet (the connection portion with the urea mixing pipe 39).

Further, as shown in FIG. 15, the exhaust gas outlet side of the inner case 136 is protruded out of the exhaust gas outlet side of the outer case 137 of the second case 29, and the outlet side lid body 141 is connected by weld fixation to the exhaust gas outlet side of the inner case 136. The outlet side lid body 141 is formed by a frustum shaped cylinder in which a diameter in the exhaust gas outlet side to which the SCR outlet pipe 37 is connected, is smaller than a diameter in the exhaust gas inlet side connected to the inner case 136. A tabular support stay body 142 is arranged in an outer side surface of the exhaust gas outlet of an outlet side lid body 141, and the SCR outlet pipe 37 and the support stay body 142 are fastened by bolts 143 to the outlet side lid body 141. The tabular support stay body 142 may be fixed by welding to the outer side surface of the exhaust gas outlet of the outlet side lid body 141.

As shown in FIGS. 6, 11, 12, and 15, one end side of the support stay body 142 is extended in an outer peripheral direction of the second case 29, one end side of a mixing pipe support body 143 is fastened by bolts 144 to an extension end portion of the support stay body 142, a receiving portion 143a is provided in the other end side of the mixing pipe support body 143, the receiving portion 143a of the mixing pipe support body 143 is fixed by welding to a urea water injection portion 146 of the urea mixing pipe 39, and the urea water injection portion 146 of the urea mixing pipe 39 is supported to the exhaust gas outlet side of the second case 29 via the support stay body 142 and the mixing pipe support body 143.

Figure 11:
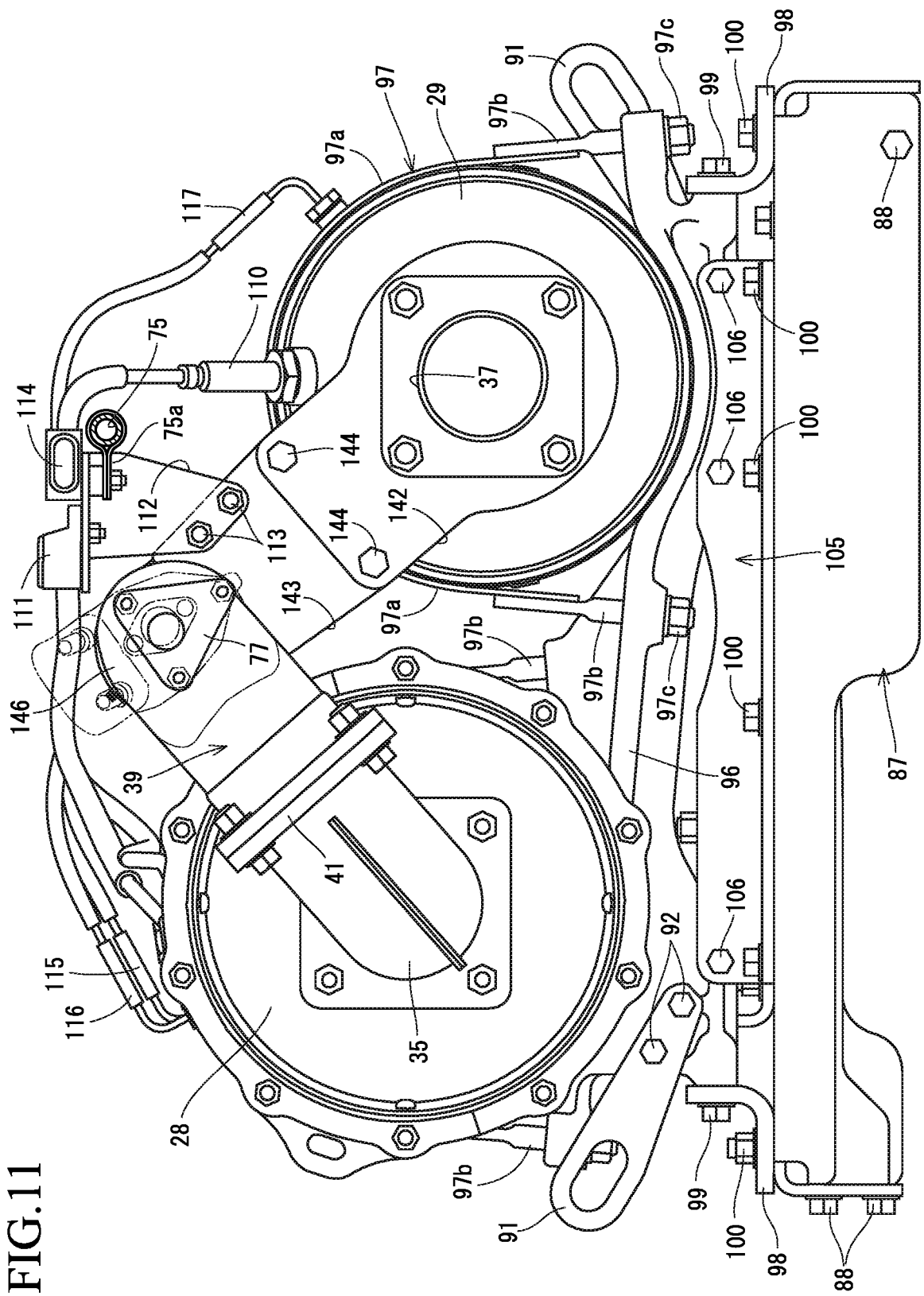
FIG. 11 is a right side elevational view of the exhaust gas purification device.
Figure 12:
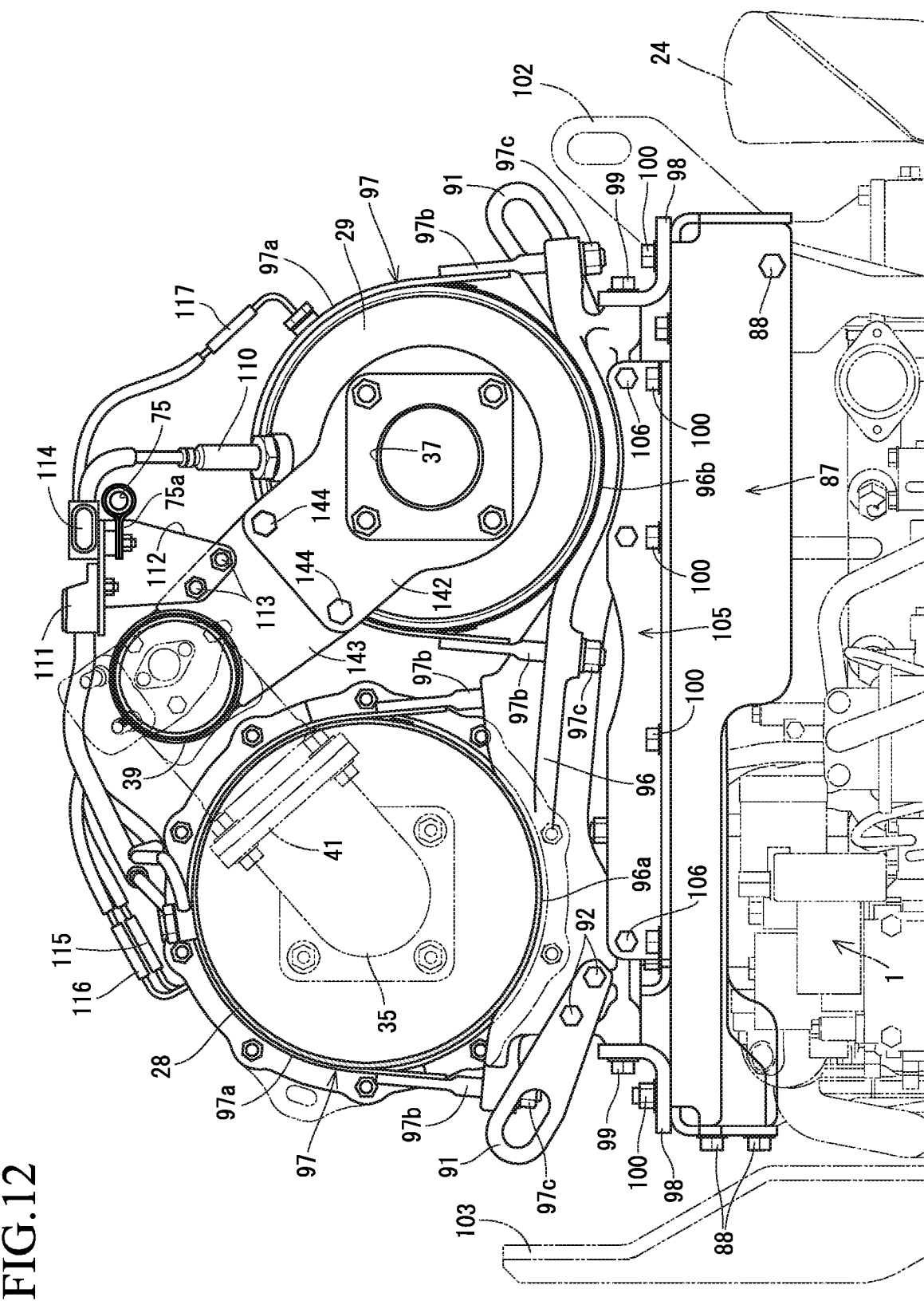
FIG. 12 is an explanatory view of a right side cross section of the exhaust gas purification device.

Meanwhile, as shown in FIGS. 11 and 12, the first case 28 is provided with DPF temperature sensors 115 and 116 which detect temperature of the exhaust gas in the vicinity of the oxidation catalyst 30 within the first case 28, and a DPF differential pressure sensor 111 which detects pressure of the exhaust gas of the soot filter 31 within the first case 28, and the second case 29 is provided with an SCR temperature sensor 117 which detects temperature of the exhaust gas inlet of the second case 29, and an NOx remaining sensor 110 which detects the nitrogen oxides (NOx) in the exhaust gas in the exhaust gas outlet side of the second case 29. A sensor bracket 112 is fastened by bolts 113 to the mixing pipe support body 143, and a wiring connector 114 electrically connected to each of the temperature sensors 115, 116, and 117 and the DPF differential pressure sensor 111 are attached to the sensor bracket 112. Further, a urea water injection pipe 75 mentioned later is attached to the sensor bracket 112 via an injection pipe holder 75a.

More specifically, since the residual volume of the particulate matters in the exhaust gas collected by the soot filter 31 is in proportion to the differential pressure of the exhaust gas, a soot filter regeneration control (for example, a fuel injection control or an intake air control of the diesel engine 1 for raising the temperature of the exhaust gas) is executed on the basis of results of detection of the differential pressure sensor 111 when an amount of the particulate matters remaining in the soot filter 31 is increased to a predetermined amount or more, the soot filter regeneration control reducing the amount of the particulate matters in the soot filter 31. Meanwhile, a urea water injection control is executed on the basis of results of detection of the NOx remaining sensor 110, the urea water injection control adjusting an amount of the urea water solution injected into the inner portion of the urea mixing pipe 39.

Further, as shown in FIGS. 17 and 19 to 22, there are provided with a urea water injection pump 73 which pressure feeds the urea water solution within a urea water tank 71, an electric motor 74 which drives the urea water injection pump 73, and a urea water injection body 76 which is connected to the urea water injection pump 73 via the urea water injection pipe 75. A urea water injection body 76 is attached to a urea water injection portion 146 of the urea mixing pipe 39 via an injection pedestal 77, and the urea water solution is sprayed into an inner portion of the urea mixing pipe 39 from the urea water injection body 76. The urea water injection portion 146 has an outer shell case 147 to which the injection pedestal 77 is fixed by welding, an outside connection pipe 148 which connects an exhaust gas inlet side of the mixing outer pipe 188 to an exhaust gas outlet side of the outer shell case 147, and a double pipe inside connection pipe 149 which is inward provided in the outer shell case 147 and the outside connection pipe 148. The exhaust gas inlet side of the inside connection pipe 149 is connected to the exhaust gas outlet side of the DPF outlet pipe 35 (a double pipe structure), and the exhaust gas inlet side of the mixing inner pipe 189 is connected to the exhaust gas outlet side of the inside connection pipe 149, thereby introducing the exhaust gas of the DPF outlet pipe 35 into the inner portion of the mixing inner pipe 189.

Further, a heat shielding concave portion 77a is formed in an adhesion surface of the injection pedestal 77 which is fixed by welding to the outer shell case 147, and the urea water injection body 76 is fastened by bolts 76b to the injection pedestal 77 which is fixed by welding to the outer shell case 147, thereby making the heat shielding concave portion 77a be spaced from a weld fixing surface of the outer shell case 147, forming the injection pedestal 77 with less adhesion area in relation to the weld fixing surface of the outer shell case 147, shielding heat of the outer shell case 147 heated by the exhaust gas by the heat shielding concave portion 77a, and preventing the injection pedestal 77 from being heated by the heat of the outer shell case 147. More specifically, it is possible to reduce transmission of the exhaust heat of the outer shell case 147 to the urea water injection body 76, and it is possible to protect a urea water injection valve 76a of the urea water injection body 76, the urea water injection pipe 75 which is communicated with and connected to the urea water injection valve 76a, or a control harness (not shown) which is electrically connected to the urea water injection valve 76a.

As shown in FIGS. 1 to 5, 11, 12, 15, 18, and 20, in the engine device having the urea mixing pipe 39 which injects the urea water into the exhaust gas of the diesel engine 1, and the second case 29 serving as the SCR case which removes the nitrogen oxides in the exhaust gas of the diesel engine 1, and connecting the inlet side of the second case 29 to the outlet side of the urea mixing pipe 39, the exhaust gas outlet side of the second case 29 is connected to the exhaust gas inlet side of the urea mixing pipe 39 where the urea water injection valve 76a serving as the urea water injection means is arranged, and the exhaust gas inlet side of the urea mixing pipe 39 is supported to the exhaust gas outlet side of the second case 29. Therefore, it is possible to improve a support rigidity of the exhaust gas inlet side of the urea mixing pipe 39 on the basis of the connection to the exhaust gas outlet side of the second case 29, it is possible to suppress a mechanical oscillation, and it is possible to reduce damage of the urea water injection valve 76a. It is possible to achieve weight saving without necessity of making the rigidity of the urea mixing pipe 39 or the second case 29 high. It is possible to achieve parts number reduction or manufacturing cost reduction of the attaching structure of the urea mixing pipe 39 by applying a piping function to the exhaust gas outlet side of the second case 29.

As shown in FIGS. 11, 12, 15, and 18, there are provided the mixing pipe support body 143 and the support stay body 142 which are detachably connected, the mixing pipe support body 143 is connected to the exhaust gas inlet side of the urea mixing pipe 39, and the support stay body 142 is connected to the exhaust gas outlet side of the second case 29. Therefore, it is possible to absorb a connection error between the first case 28 or the second case 29 and the case fixing bodies 95 and 96, or an attaching dimension error in the exhaust gas inlet side of the urea mixing pipe 39 by adjusting the connection between the mixing pipe support body 143 and the support stay body 142, and it is possible to improve a piping workability for connecting to the exhaust gas inlet side of the urea mixing pipe 39 as well as it is possible to improve an assembling workability of the urea mixing pipe 39.

For example, when assembling the exhaust gas purification device 27, the left case fixing body 95 and the right case fixing body 96 are fastened by bolts 99 and 106 to the support frame body 98 and the side portion support frame body 105, as well as the support frame body 98 and the side portion support frame body 105 are fastened by bolts 100 to the support base 87. Further, the first case 28 and the second case 29 are mounted to the left case fixing body 95 and the right case fixing body 96, the DPF outlet pipe 35 is connected to the exhaust gas inlet side of the urea mixing pipe 39 via the DPF outlet side flange body 41, and the mixing pipe support body 143 and the support stay body 142 are fastened by bolts 144. The fastening between the mixing pipe support body 143 and the support stay body 142 by bolts 144 absorbs the connection error between the mixing pipe support body 143 and the support stay body 142 by loosely fitting and inserting the bolts 144 to one or both of the mixing pipe support body 143 and the support stay body 142.

Next, the fastening band 97 is wound around the outer peripheries of the first case 28 and the second case 29, both end sides of the fastening band main body 97a are connected to the left case fixing body 95 and the right case fixing body 96 via the fastening bolt 97b and the fastening nut 97c, and the first case 28 and the second case 29 are firmly fixed to the left case fixing body 95 and the right case fixing body 96. More specifically, the first case 28 and the second case 29 are fixedly supported to the left case fixing body 95 and the right case fixing body 96, thereby finishing the assembling work of the exhaust gas purification device 27.

Figure 18:
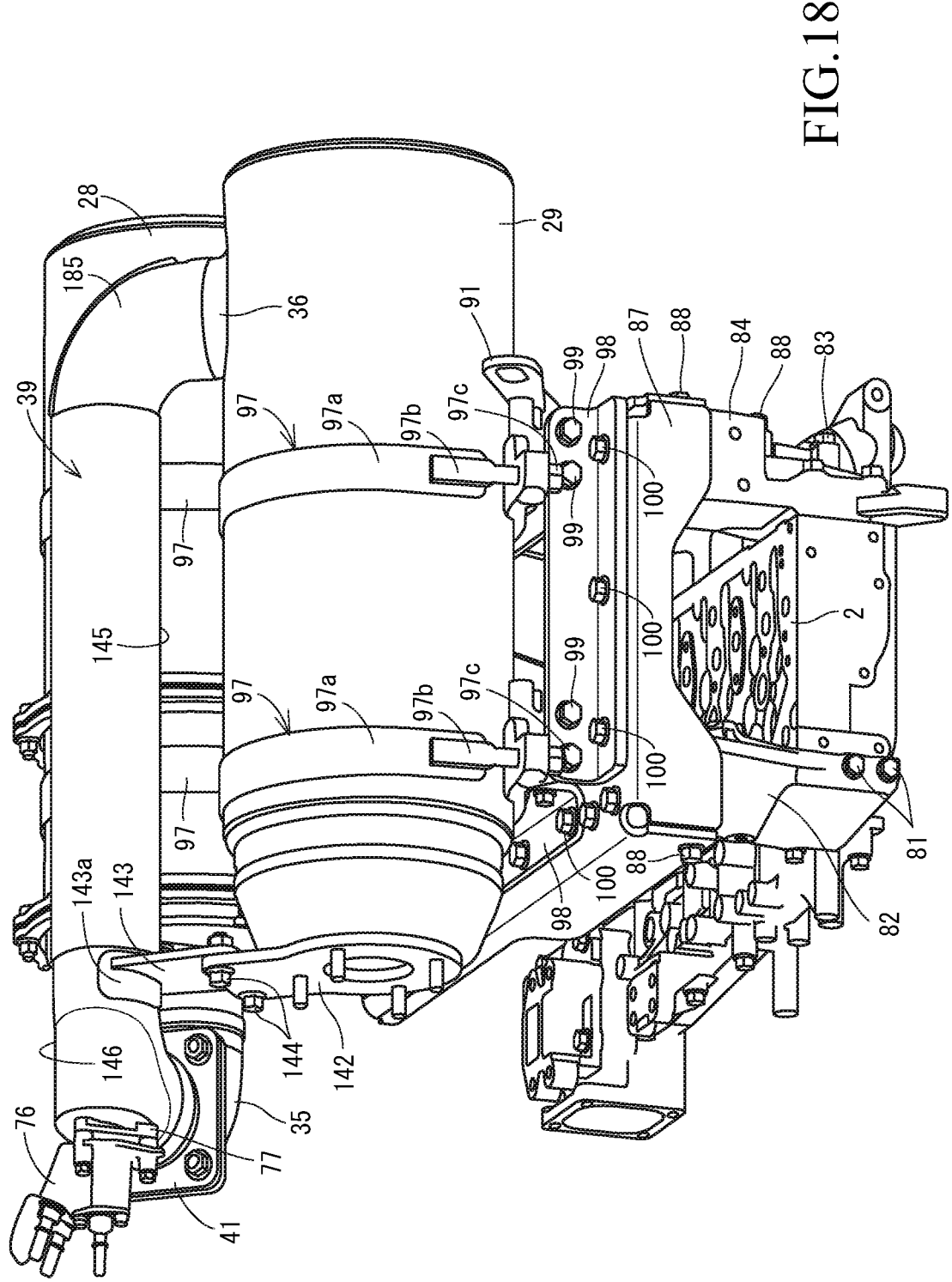
FIG. 18 is an explanatory view of a front surface of the exhaust gas purification device and the cylinder head support portion.
Figure 19:
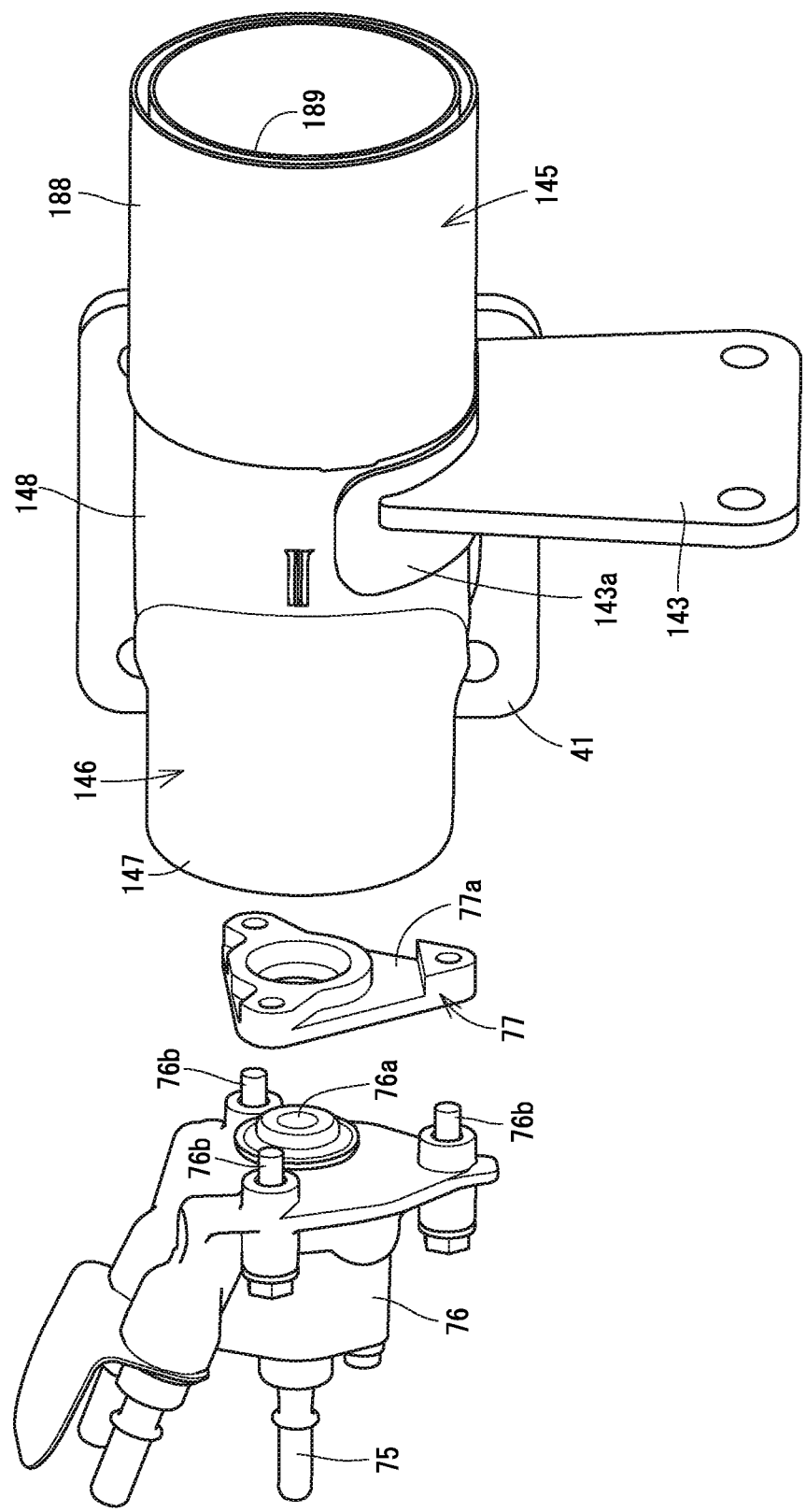
FIG. 19 is an exploded explanatory view of a urea injection portion of the urea mixing pipe.
Figure 20:
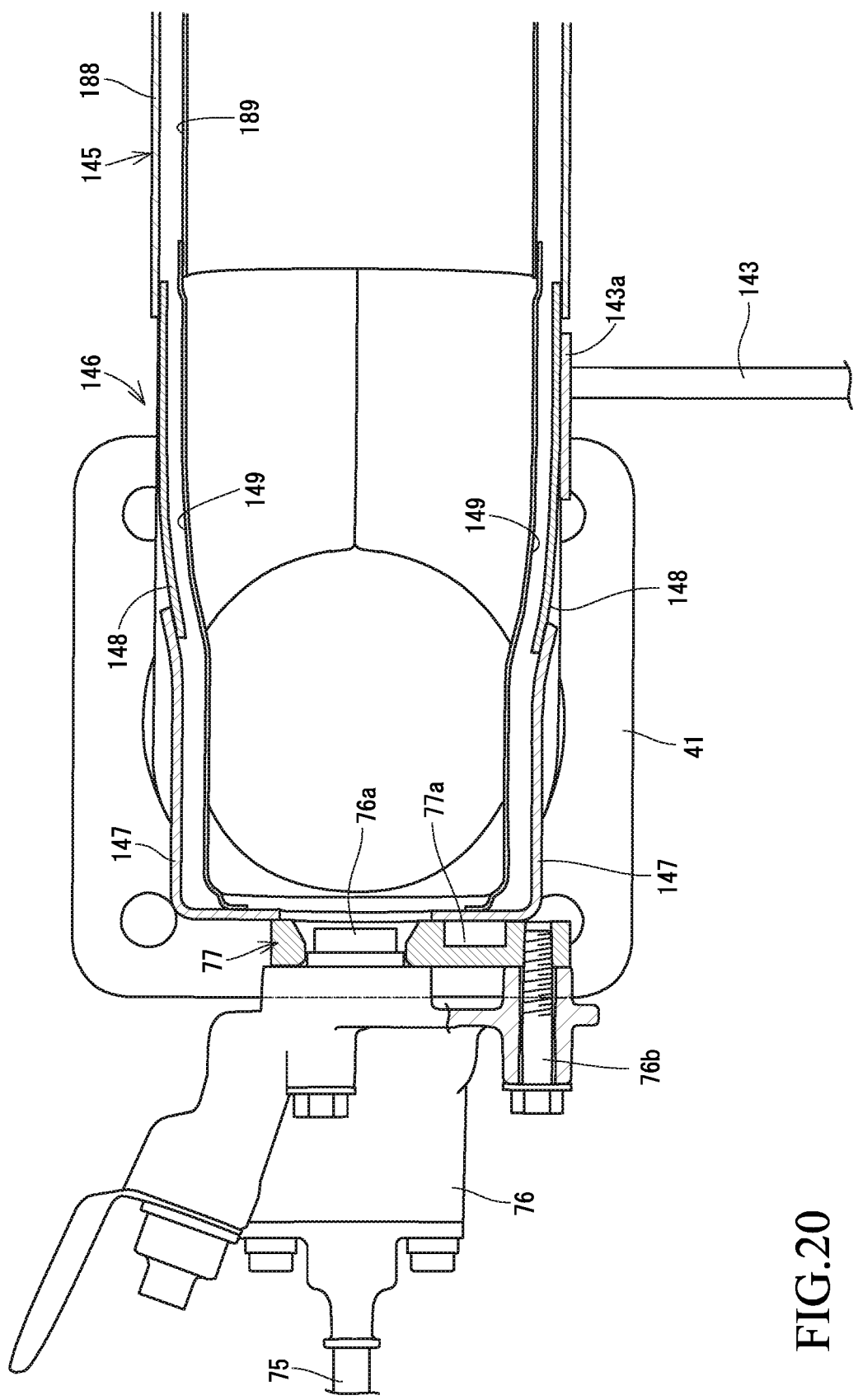
FIG. 20 is an explanatory view of a cross section of the urea injection portion of the urea mixing pipe.

As shown in FIGS. 15 and 18, the exhaust gas inlet side of the second case 29 is firmly fixed integrally to the exhaust gas outlet side of the urea mixing pipe 39, the urea water injection portion 146 is arranged in the exhaust gas inlet side of the urea mixing pipe 39, and the mixing pipe support body 143 is firmly fixed integrally to the outer peripheral surface of the urea water injection portion 146 where the urea water injection valve 76a is arranged, at the same time. Therefore, it is possible to support in a quakeproofing manner the exhaust gas inlet side of the urea mixing pipe 39, it is possible to reduce the oscillation of the urea water injection portion 146 where the urea water injection valve 76a is arranged, and it is possible to improve the durability of the urea water injection portion 146.

As shown in FIGS. 11, 12, and 15, the SCR outlet pipe 37 serving as the exhaust pipe is fastened and fixed to the exhaust gas outlet side of the second case 29 via the support stay body 142. Therefore, the support stay body 142 can be attached to the second case 29 by using the bolts 143 fastening the SCR outlet pipe 37 to the second case 29 in common. It is possible to apply a connection function of the SCR outlet pipe 37 to the support stay body 142, and it is possible to reduce the manufacturing cost by reducing the constituting parts number. It is possible to structure such that the SCR outlet pipe 37 can be fastened by bolts 143 to the support stay body 142 by fixing the support stay body 142 by welding to the exhaust gas outlet side of the second case 29, and the support stay body 142 and the SCR outlet pipe 37 are connected in common to the exhaust gas outlet side of the second case 29 by the bolts 143.

Figure 22:
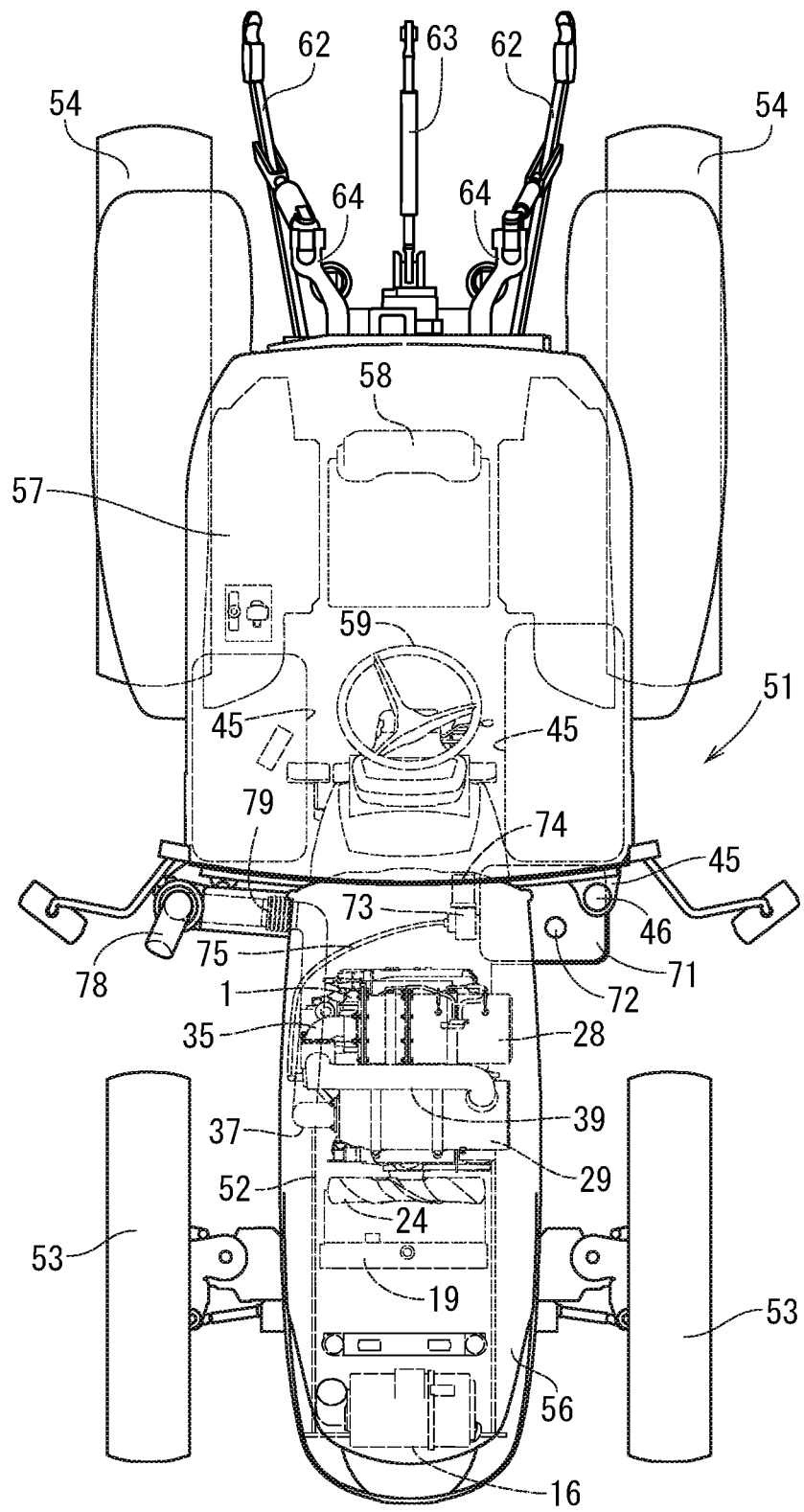
FIG. 22 is a plan view of the same.

Next, a description will be given of a tractor 51 which mounts the diesel engine 1 thereon with reference to FIGS. 21 and 22. The tractor 51 serving as the working vehicle shown in FIGS. 21 and 22 is adapted to perform a tilling work for tilling a farm field by being installed a tilling work machine (not shown). FIG. 21 is a side elevational view of a tractor for an agricultural work, and FIG. 22 is a plan view of the same. In the following description, a left side in a direction toward a forward moving direction of the tractor is simply called as a left side, and a right side in the direction toward the forward moving direction is simply called as a right side.

As shown in FIGS. 21 and 22, the tractor 51 for the agricultural work serving as the working vehicle is adapted to travel forward and backward by supporting a travel machine body 52 by a pair of right and left front wheels 53 and a pair of right and left rear wheels 54, mounting the diesel engine 1 to a front portion of the travel machine body 52, and driving the rear wheels 54 and the front wheels 53 by the diesel engine 1. The upper surface side and both the right and left side surfaces of the diesel engine 1 are covered with a hood 56 which can be opened and closed.

Further, a cabin 57 which an operator gets on board is installed in a rear side of the hood 56 among the upper surface of the travel machine body 52. An inner portion of the cabin 57 is provided with a control seat 58 on which the operator seats, and control instruments such as a control steering wheel 59 serving as a steering means. Further, a pair of right and left steps 60 for the operator to get on and off are provided in right and left outside portions of the cabin 57, and a fuel tank 45 for supplying the fuel to the diesel engine 1 is provided in a lower side of a bottom portion of the cabin 57 and inside the step 60.

Further, the travel machine body 52 is provided with a transmission case 61 for changing speed of the output from the diesel engine 1 so as to transmit it to the rear wheels 54 (the front wheels 53). The tilling work machine (not shown) is coupled to a rear portion of the transmission case 61 via a lower link 62, a top link 63, and a lift arm 64 so as to be movable up and down. Further, a PTO shaft 65 driving the tilling work machine is provided in a rear side surface of the transmission case 61. The travel machine body 52 of the tractor 51 is constructed by the diesel engine 1, the transmission case 61, and a clutch case 66 coupling them.

In addition, the exhaust gas purified by the second case 29 is discharged from a tail pipe 78 toward an upper side of the cabin 57 by disposing the tail pipe 78 in a rising manner on a front surface of a right corner portion of the cabin 57 in the front surface of the cabin 57, extending a lower end side of the tail pipe 78 toward an inner portion of the hood 56, and connecting a lower end side of the tail pipe 78 to the SCR outlet pipe 37 via a bellows tubular flexible pipe 79, as shown in FIGS. 21 and 22. The machine vibration transmitted to the tail pipe 78 side from the diesel engine 1 side is reduced by the connection of the flexible pipe 79. Further, a urea water tank 71 is installed to a left side portion of the hood 56 in an opposite side to a right side portion where the tail pipe 78 is arranged, in the front surface of the cabin 57. More specifically, the urea water tank 71 is arranged in a sorting manner in the left side portion of the rear portion of the hood 56 while the tail pipe 78 is arranged in the right side portion of the rear portion of the hood 56.

Further, the urea water tank 71 is mounted to the travel machine body 52 (a bottom portion frame of the cabin 57) in the leftward rear portion of the hood 56. An oil hole 46 of the fuel tank 45 and a water filler 72 of the urea water tank 71 are adjacently provided in a lower portion of a front surface in the left side of the cabin 57. The tail pipe 78 is arranged in the front surface in the right side of the cabin 57 where an operator gets on and off with low frequency, and the oil hole 46 and the water filler 72 are arranged in the front surface in the left side of the cabin 57 where the operator gets on and off with high frequency. The cabin 57 is structured such that the operator can get on and off the control seat 58 from any of the left side and the right side.

According to the structure mentioned above, the carbon monoxide (CO) and the carbon hydride (HC) in the exhaust gas of the diesel engine 1 can be reduced by the oxidation catalyst 30 and the soot filter 31 within the first case 28. Next, the urea water from the urea water injection valve 76a is mixed into the exhaust gas from the diesel engine 1 in the inner portion of the urea mixing pipe 39. Further, the nitrogen oxides (NOx) in the exhaust gas mixed with the urea water as ammonia is reduced by the SCR catalyst 32 and the oxidation catalyst 33 within the second case 29, and is discharged out of the tail pipe 78 toward the machine outside.

Figure 23:
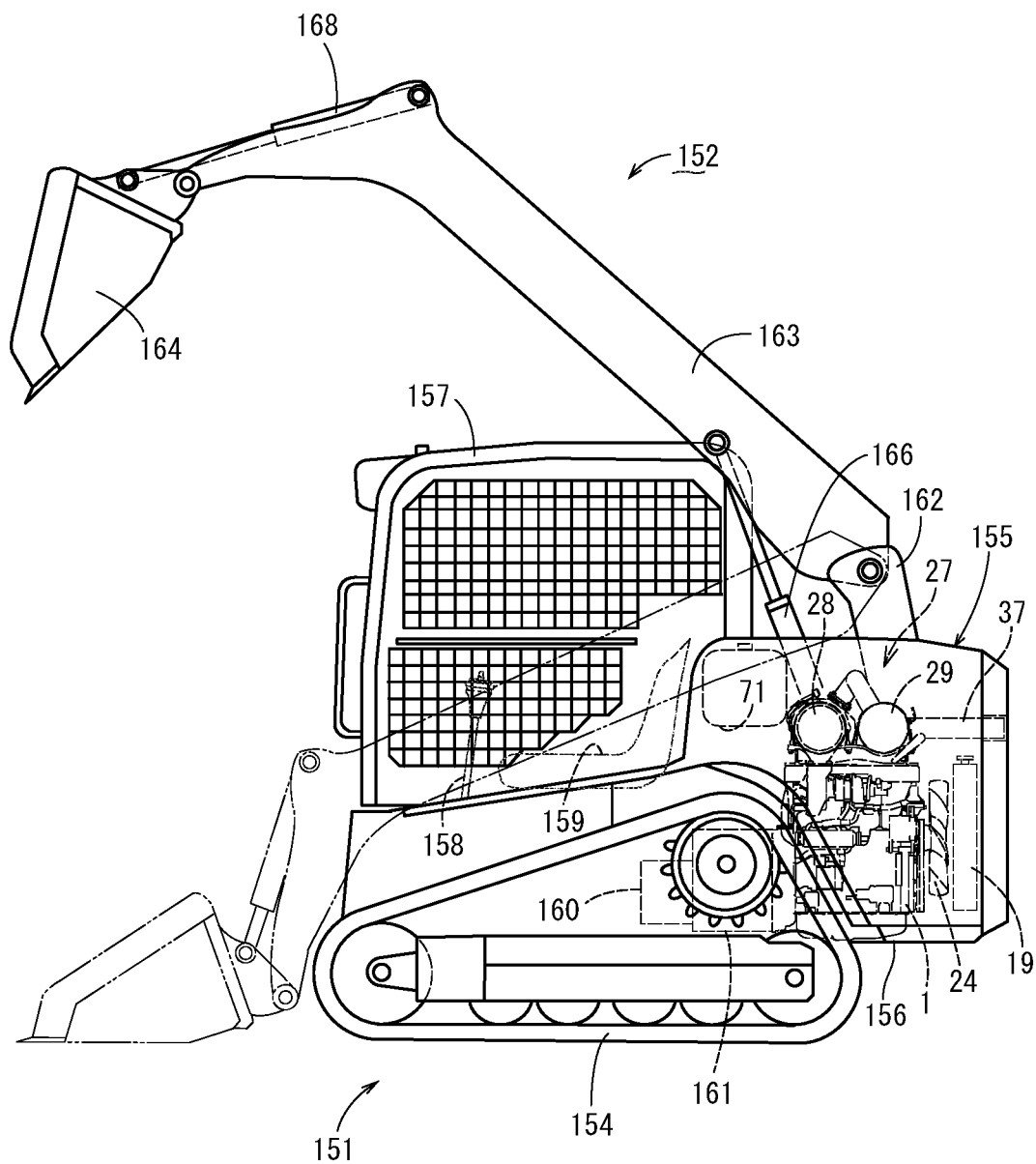
FIG. 23 is a side elevational view of a working vehicle which mounts a diesel engine thereto.
Figure 24:
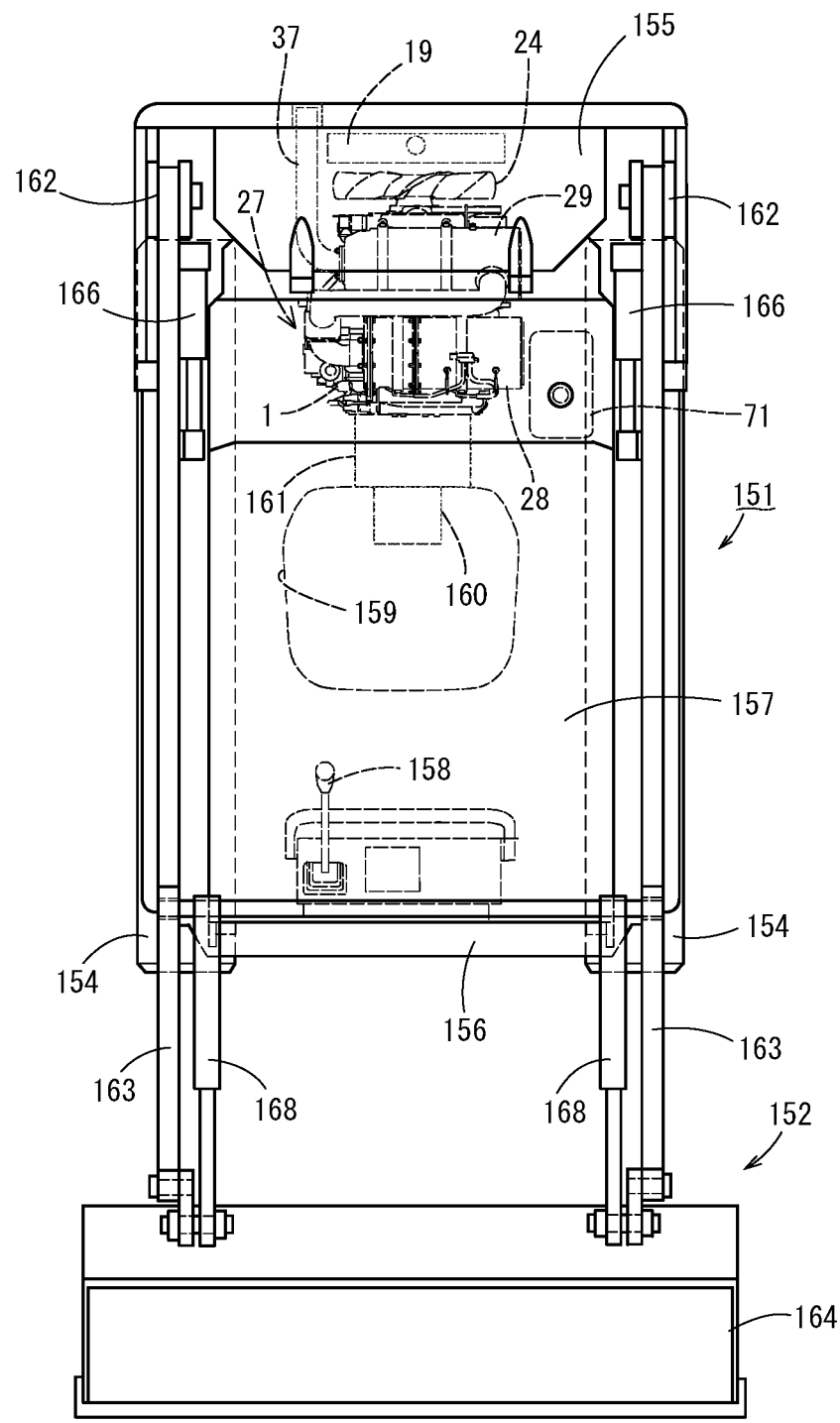
FIG. 24 is a plan view of the working vehicle.

Next, a description will be given of a skid steer loader 151 which mounts the diesel engine 1 thereon, with reference to FIGS. 23 and 24. The skid steer loader 151 shown in FIGS. 23 and 24 and serving as the working vehicle installs a loader device 152 mentioned later thereto and is adapted to carry out a loading work. Right and left travel crawler portions 154 are installed to the skid steer loader 151. Further, an openable hood 155 is arranged above the travel crawler portions 154 of the skid steer loader 151. The diesel engine 1 is accommodated within the hood 155. The first case 28 and the second case 29 are mounted on and fixed to the upper surface portion of the diesel engine 1.

The diesel engine 1 is supported to a travel machine body 156 provided in the skid steer loader 151 via a vibration isolation member. A cabin 157 which a driver gets on board is arranged in front of the hood 155, and a control steering wheel 158 and a driver seat 159 are provided in an inner portion of the cabin 157. Further, there are provided a loading work hydraulic pump device 160 which is driven by the diesel engine 1, and a travel transmission device 161 which drives the right and left travel crawler portion 154. The power from the diesel engine 1 is transmitted to the right and left travel crawler portions 154 via the travel transmission device 161. An operator seating on the driver seat 159 can carry out a traveling operation of the skid steer loader 151 via a control portion such as the control steering wheel 158.

Further, the loader device 152 has loader posts 162 which are arranged both right and left sides of the travel machine body 156, a pair of right and left lift arms 163 which are connected to upper ends of the loader posts 162 so as to be freely oscillated up and down, and a bucket 164 which is connected to leading end portions of the right and left lift arms 163 so as to be freely oscillated up and down.

Lift cylinders 166 for oscillating up and down the lift arms 163 are respectively provided between the loader posts 162 and the corresponding lift arms 163. Bucket cylinders 168 for oscillating up and down the bucket 164 are provided between the right and left lift arms 163 and the bucket 164. In this case, a hydraulic force of the loading work hydraulic pump device 160 is controlled according to an operation of a loader lever (not shown) by the operator on the control seat 159, the lift cylinders 166 and the bucket cylinders 168 are actuated to be expanded and contracted, and oscillate up and down the lift arms 163 and the bucket 164, and the loading work is adapted to be executed. The urea water tank 71 is inward provided in an upper portion in a forward lateral side of the hood 155. Further, the radiator 19 arranged so as to be opposed to the cooling fan 24 is inward provided in a rear portion of the hood 155.

As shown in FIGS. 1 to 7, 12 to 14, 21, and 23, in the engine device having the exhaust gas purification device 27 which removes the particulate matters in the exhaust gas of the diesel engine 1 or the nitrogen oxides in the exhaust gas of the diesel engine 1, in which the exhaust gas purification device 27 is firmly fixed to the support base 87, the exhaust gas outlet pipe 7 of the diesel engine 1 is provided with the exhaust gas outlet surface 7a serving as the exhaust connection portion which connects the exhaust gas inlet of the exhaust gas purification device 27, and the positioning step portion 7b serving as the support base connection portion which connects the support base 87. Therefore, it is possible to make the position of center of gravity of the diesel engine 1 low by lowering the support position of the exhaust gas purification device 27 which is the heavy part in relation to the diesel engine 1, so that it is possible to reduce the oscillation of the exhaust gas purification device 27 and it is possible to prevent the damage of the exhaust gas purification device 27. Further, it is possible to reduce the oscillation of the diesel engine 1 and it is possible to easily secure the vehicle body strength of the vehicle (the tractor 51 and the skid steer loader 151) to which the diesel engine 1 is mounted. Further, it is possible to inhibit the respective support attitudes of the exhaust gas inlet of the exhaust gas purification device 27 and the support base 87 from being restricted by each other, it is possible to easily select the installation layouts of the exhaust gas purification device 27 or the support base 87 in correspondence to the specification of the exhaust gas purification device 27 or the installation structure of the diesel engine 1, and it is possible to improve the mounting property of the diesel engine 1 to the vehicle body or the general versatility of the diesel engine 1.

Figure 13:
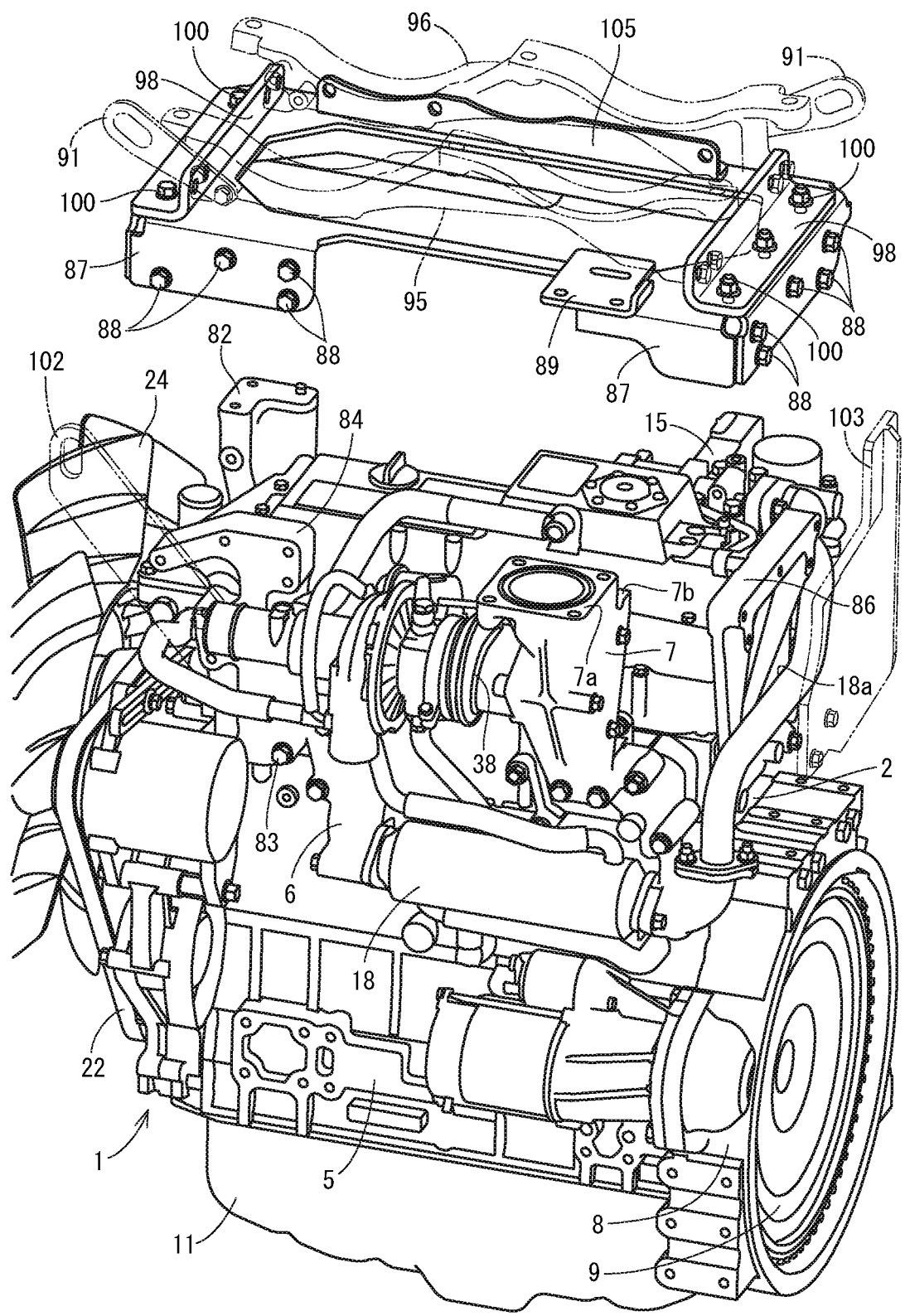
FIG. 13 is an exploded explanatory view of a support base portion of the exhaust gas purification device.
Figure 14:
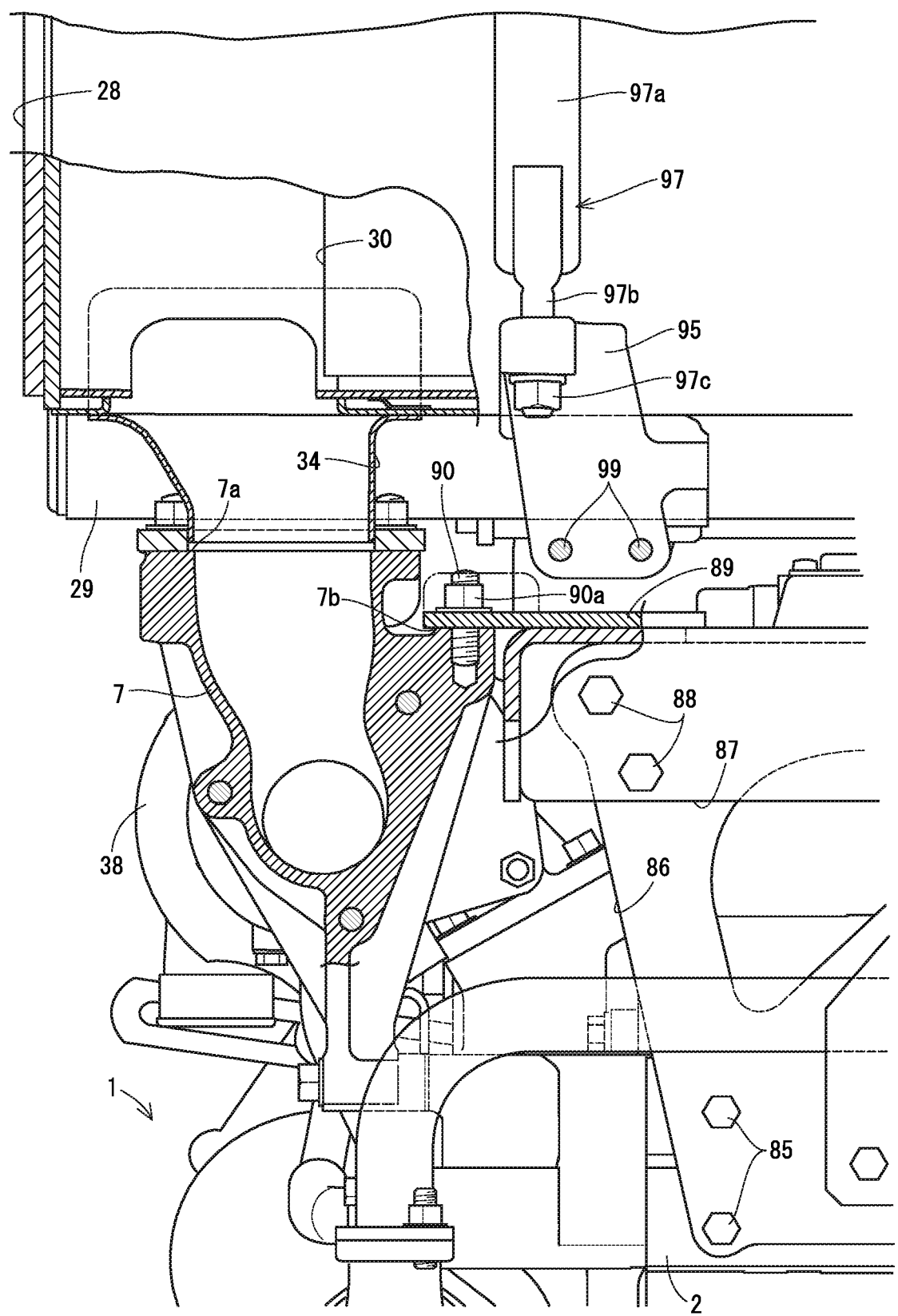
FIG. 14 is an explanatory view of a cross section of the support base portion of the exhaust gas purification device.

As shown in FIGS. 12 to 14, the upper surface of the exhaust gas outlet pipe 7 where the positioning step portion 7b is formed is formed lower than the upper surface of the exhaust gas outlet pipe 7 where the exhaust gas outlet surface 7a is formed in the upper surface of the exhaust gas outlet pipe 7, by forming in a staircase pattern the exhaust gas outlet surface 7a and the positioning step portion 7b which are formed in parallel in the upper surface side of the exhaust gas outlet pipe of the diesel engine 1. Therefore, it is possible to form the exhaust gas outlet surface 7a and the positioning step portion 7b by the parallel planes having difference in height, it is possible to easily dissolve the attaching error between the exhaust gas inlet of the exhaust gas purification device 27 and the support base 87 by the spacer which is provided in the positioning step portion 7b, and it is possible to simplify the adjustment of the attaching height of the exhaust gas purification device 27 or the support base 87. In addition, it is possible to form the support leg parts (the front portion support leg body 82, the side portion support leg body 84, and the rear portion support leg body 86) for attaching the support base 87 to the diesel engine 1 compactly, and it is possible to achieve the weight saving, the cost reduction, and the rigidity improvement. Further, it is possible to reduce the parts number of the attaching structure of the exhaust gas purification device 27, and it is possible to improve the assembling rigidity of the exhaust gas purification device 27 in spite that the manufacturing cost can be reduced.

As shown in FIGS. 1 to 7 and 12 to 14, in the structure having the first case 28 serving as the DPF case which removes the particulate matters in the exhaust gas of the diesel engine 1, the second case 29 serving as the SCR case which removes the nitrogen oxides in the exhaust gas of the diesel engine 1, and the urea mixing pipe 39 which injects the urea water into the exhaust gas of the diesel engine 1, as the exhaust gas purification device 27, the upper surface of the support base 87 is provided with the rear mounting portions 95a and 96a of the case fixing bodies 95 and 96 serving as the DPF case mounting portion which mounts the first case 28 thereto, and the front mounting portions 95b and 96b of the case fixing bodies 95 and 96 serving as the SCR case mounting portion which mounts the second case 29 thereto, the first case 28 and the second case 29 are provided side by side in the upper surface side of the support base 87, and the upper surfaces of the front mounting portions 95b and 96b of the support base 87 are formed lower than the upper surfaces of the rear mounting portions 95a and 96a of the support base 87 in the upper surface of the support base 87. Therefore, in spite that it is possible to easily lighten the oscillation of the diesel engine 1 which is supported in an oscillation preventing manner to the vehicle body of the various vehicles (the tractor 51 and the skid steer loader 151) by lowering the support position of the exhaust gas purification device 27 and setting the center of gravity of the diesel engine 1 to the low position, it is possible to make the support position of the urea mixing pipe 39 low by lowering the support position of the second case 29. As a result, it is possible to form a total height of the diesel engine 1 low, it is possible to reduce the restriction of the vehicle body structure of the vehicle (the tractor 51 and the skid steer loader 151) which mounts the diesel engine 1 thereto, and it is possible to easily improve the mounting property of the diesel engine 1 to the vehicle body or the general versatility of the diesel engine 1.

As shown in FIGS. 1 to 7 and 12 to 14, in the structure having the exhaust gas recirculation device 15 which supplies a part of the exhaust gas of the exhaust gas manifold 6 and the EGR cooler 18 in the intake air manifold 3 of the diesel engine 1, and having the exhaust gas manifold 6 installed to the side surface of the cylinder head 2 of the diesel engine 1, the supercharger 38 and the exhaust gas outlet pipe 7 are arranged in close vicinity to the upper surface side of the exhaust gas manifold 6, and the EGR cooler 18 is arranged in close vicinity to the lower surface side of the exhaust gas manifold 6. Therefore, in spite that the supercharger 38 and the EGR cooler 18 can be compactly supported to the side surface of the diesel engine 1 in which the exhaust gas manifold 6 is installed, the exhaust gas purification device 27 can be installed with low height to the upper surface side of the diesel engine 1 via the support base 87, an engine room of the vehicle (the tractor 51 and the skid steer loader 151) to which the diesel engine 1 is mounted can be structured compactly, and it is possible to easily improve the mounting property of the diesel engine 1 to the vehicle body or the general versatility of the diesel engine 1.

The embodiments of the present invention relates to an engine device such as a diesel engine which is mounted to an agricultural machine (a tractor and a combine harvester) or a construction machine (a bulldozer, a hydraulic excavator, and a loader), and more particularly to an engine device to which an exhaust gas purification device is mounted, the exhaust gas purification device removing particulate matters (soot and particulate) included in exhaust gas, or nitrogen oxides (NOx) included in the exhaust gas.

What is claimed is:
1. An engine device comprising:
an exhaust gas purification device configured to remove particulate matter in exhaust gas of an engine or nitrogen oxides in the exhaust gas of the engine,
wherein:
the exhaust gas purification device is coupled to a support base,
an exhaust gas outlet pipe of the engine is provided with:
an exhaust connection portion coupled to an exhaust gas inlet of the exhaust gas purification device, and
a support base connection portion coupled to the support base,
a first surface of the exhaust connection portion defines a first plane and a second surface of the support base connection portion defines a second plane that is parallel to the first plane,
each of the first surface and the second surface is disposed on an upper surface side of the exhaust gas outlet pipe of the engine,
the second surface is in contact with the support base,
the first surface comprises a first upper surface of the exhaust gas outlet pipe, the second surface comprises a second upper surface of the exhaust gas outlet pipe, and the second surface is positioned lower than the first surface.

2. The engine device according to claim 1, wherein the first surface is in contact with the exhaust gas inlet.

3. The engine device according to claim 1, wherein the exhaust gas purification device is provided with:
a DPF case configured to remove the particulate matter in the exhaust gas of the engine,
an SCR case configured to remove the nitrogen oxides in the exhaust gas of the engine, and
a urea mixing pipe configured to inject urea water into the exhaust gas of the engine.

4. The engine device according to claim 3, wherein:
an upper surface of the support base is provided with a DPF case mounting portion mounted to the DPF case, and
an SCR case mounting portion mounted to the SCR case.

5. The engine device according to claim 4, wherein:
the DPF case and the SCR case are arranged side by side in the upper surface side of the support base, and
an upper surface of the SCR case mounting portion of the support base is formed lower than an upper surface of the DPF case mounting portion of the support base in the upper surface of the support base.

6. The engine device according to claim 1, wherein:
an intake air manifold of the engine is provided with:
an exhaust gas recirculation device configured to supply a part of the exhaust gas of an exhaust gas manifold, and
an EGR cooler.

7. The engine device according to claim 6, wherein:
the exhaust gas manifold is installed in a side surface of a cylinder head of the engine,
a supercharger and the exhaust gas outlet pipe are arranged in close vicinity to an upper surface side of the exhaust gas manifold, and
the EGR cooler is arranged in close vicinity to a lower surface side of the exhaust gas manifold.

8. The engine device according to claim 1, wherein:
the exhaust gas purification device is coupled to the support base,
the support base is mounted to the engine via a support leg body, and
an engine suspension member is coupled to the support leg body, the engine suspension member configured to enable movement of the engine using a material handling machine.

9. The engine device according to claim 8, wherein:
a rear portion support leg body is provided as the support leg body configured to enable a fix position of the engine suspension member,
the rear portion support leg body is fastened to a side surface above a flywheel of the engine,
in the side surface of a cylinder head of the engine, the rear portion support leg body is provided in a rising manner in the side surface in the flywheel installing side of the engine, and
a plurality of bolts configured to fasten the engine suspension member are arranged in an outer side surface side of the rear portion support leg body in a diagonally vertical direction.

10. The engine device according to claim 8, wherein:
an intake air manifold of the engine is provided with:
an exhaust gas recirculation device configured to supply a part of the exhaust gas of an exhaust gas manifold, and
an EGR cooler.

11. The engine device according to claim 10, wherein:
an EGR pipe for returning the exhaust gas is extended between the exhaust gas recirculation device and the EGR cooler,
a spacer for the engine suspension member is provided in the support leg body,
the engine suspension member is fastened to the spacer of the support leg body, and
an arrangement space of the EGR pipe for returning the exhaust gas is formed between the support leg body and the engine suspension member.

12. The engine device according to claim 8, wherein:
a side portion support leg body and a rear portion support leg body are provided as the support leg body to enable a fixed position of the engine suspension member,
a front portion engine suspension member is provided in the side portion support leg body, and
a rear portion engine suspension member is provided in the rear portion support leg body.

13. The engine device according to claim 8, wherein:
the material handling machine comprises a hoist or a chain block configured to suspend the engine.

14. An engine device comprising:
an engine comprising an exhaust gas outlet pipe, the exhaust gas outlet pipe comprising:
an exhaust connection portion; and
a support base connection portion configured to be coupled to a support base, wherein:
a first surface of the exhaust connection portion defines a first plane and a second surface of the support base connection portion defines a second plane that is parallel to the first plane,
each of the first surface and the second surface is disposed on an upper surface side of the exhaust gas outlet pipe of the engine,
the second surface is configured to be in contact with the support base, and
the second surface of the support base connection portion is positioned lower than the first surface of the exhaust connection portion.

15. The engine device according to claim 14, wherein:
the exhaust connection portion is configured to be coupled to an exhaust gas inlet of an exhaust gas purification device, and
the first surface is configured to be in contact with the exhaust gas inlet.

16. The engine device according to claim 14, further comprising:
an exhaust gas purification device coupled to the support base and comprising an exhaust gas inlet coupled to the exhaust connection portion.

17. The engine device according to claim 16, wherein the exhaust gas purification device is configured to remove particulate matter in exhaust gas of the engine or nitrogen oxides in the exhaust gas of the engine.

18. An engine device comprising:
an engine comprising an exhaust gas outlet pipe, the exhaust gas outlet pipe comprising:
an exhaust connection portion; and
a support base connection portion configured to be coupled to a support base, wherein:
a first surface of the exhaust connection portion defines a first plane and a second surface of the support base connection portion defines a second plane that is parallel to the first plane, each of the first surface and the second surface is disposed on an upper surface side of the exhaust gas outlet pipe of the engine, the second surface is configured to be in contact with the support base, the exhaust connection portion is configured to be coupled to an exhaust gas inlet of an exhaust gas purification device, and the first surface is configured to be in contact with the exhaust gas inlet.

19. The engine device according to claim 18, wherein:

the exhaust gas purification device is coupled to the support base, the support base is mounted to the engine via a support leg body, and an engine suspension member is coupled to the support leg body, the engine suspension member configured to enable movement of the engine using a material handling machine.

20. The engine device according to claim 18, wherein the exhaust gas purification device is provided with:

a DPF case configured to remove particulate matter in exhaust gas of the engine, an SCR case configured to remove nitrogen oxides in the exhaust gas of the engine, and a urea mixing pipe configured to inject urea water into the exhaust gas of the engine, wherein:

an upper surface of the support base is provided with a DPF case mounting portion mounted to the DPF case, and an SCR case mounting portion mounted to the SCR case.

* * * * *